Oct. 11, 1966  G. M. STEIN  3,278,879
INTERLEAVED SERIES SECTIONS IN PANCAKE COILS
Filed June 16, 1964  12 Sheets-Sheet 1
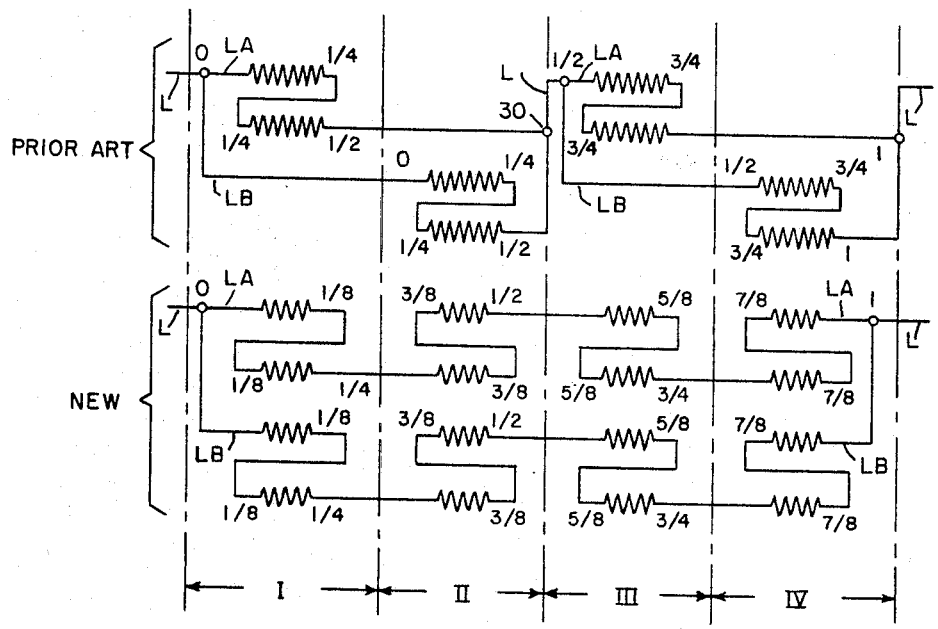
Fig. I
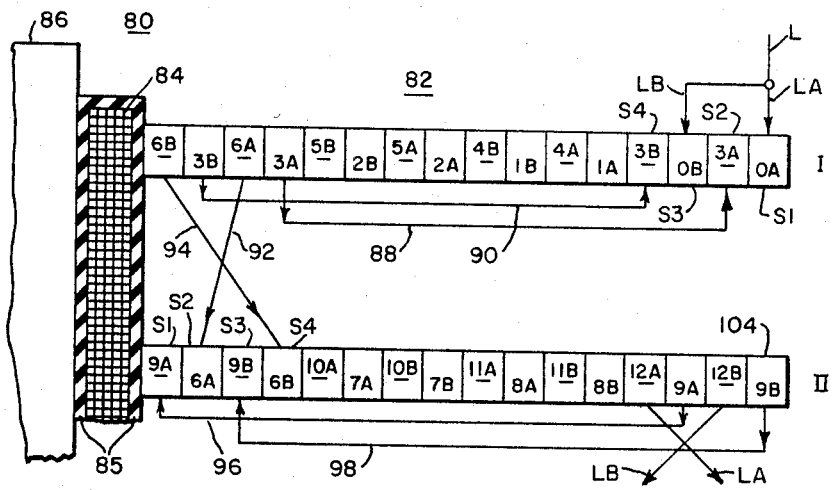
Fig. 4
WITNESSES
Leon J. Jaza
James F. Young
INVENTOR
Gerhard M. Stein
BY
Donald R. Lackey
ATTORNEY

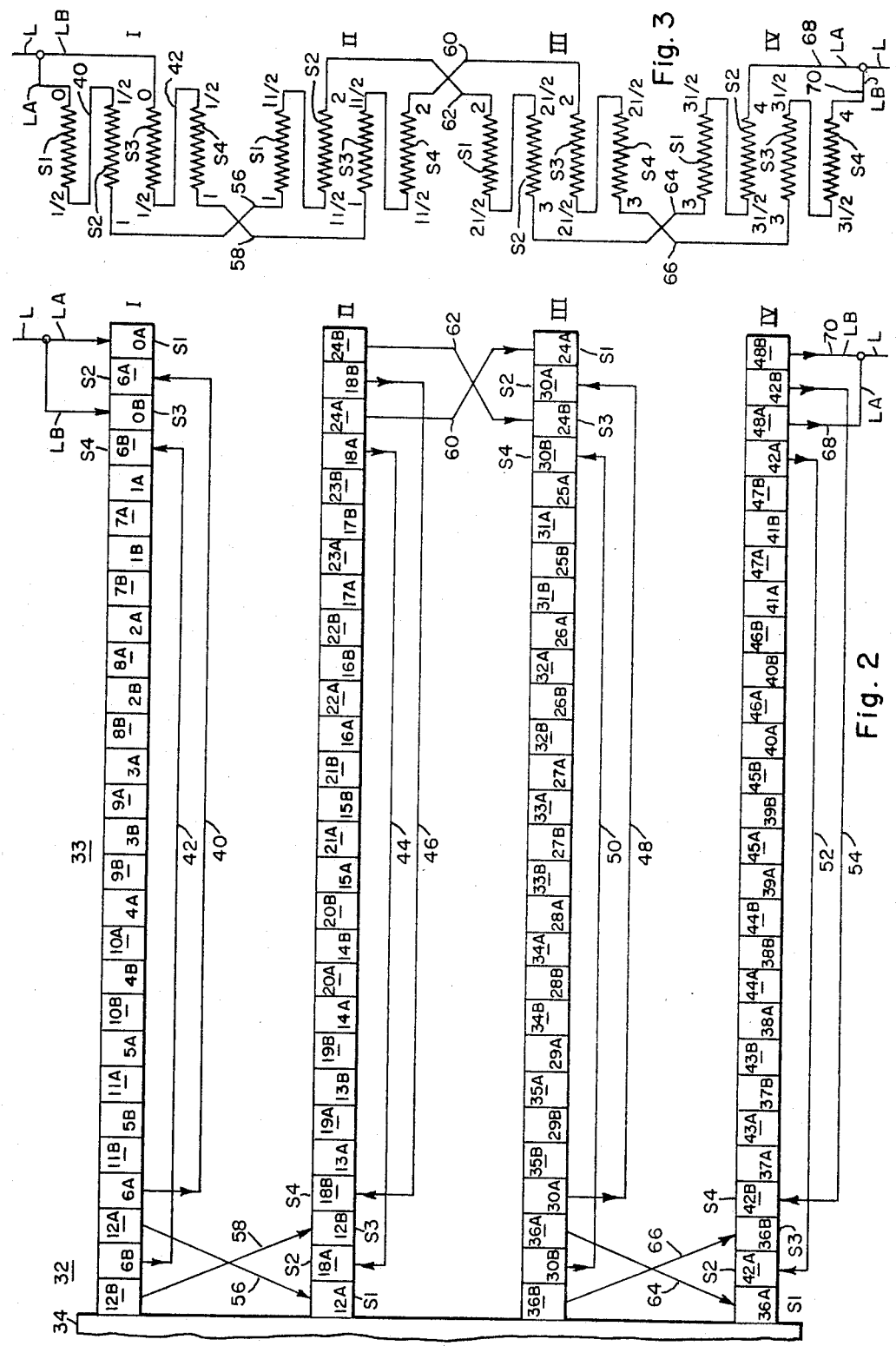

Oct. 11, 1966
G. M. STEIN
3,278,879
INTERLEAVED SERIES SECTIONS IN PANCAKE COILS
Filed June 16, 1964
12 Sheets-Sheet 3
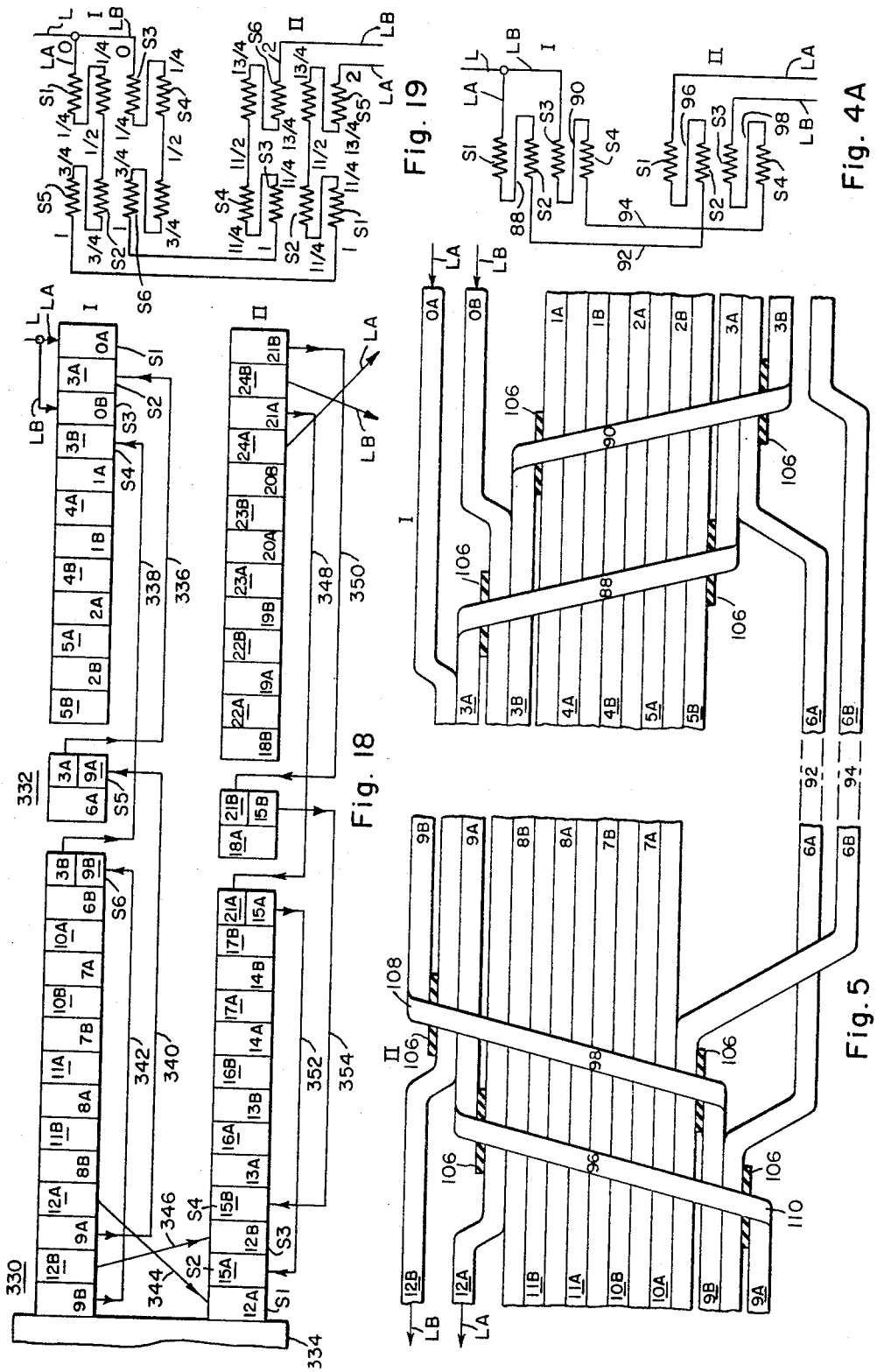

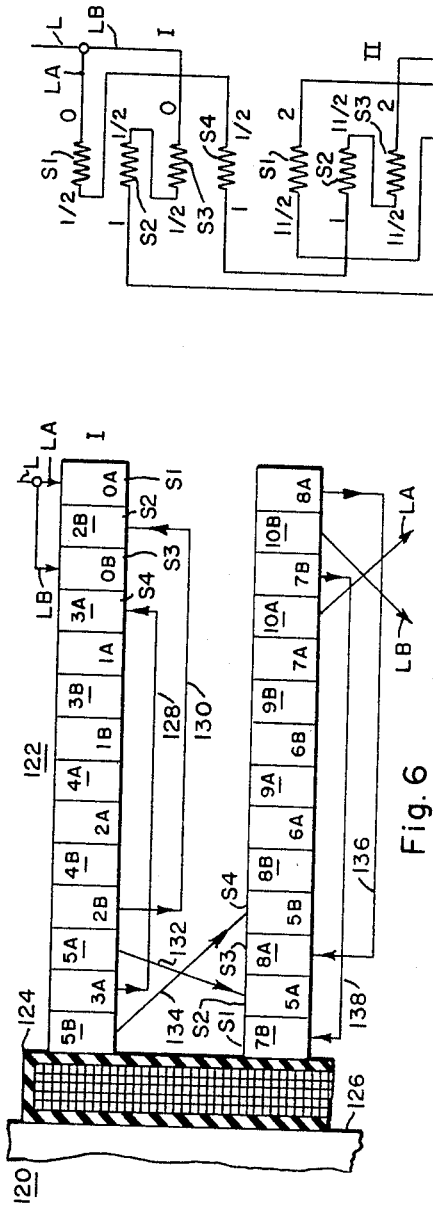
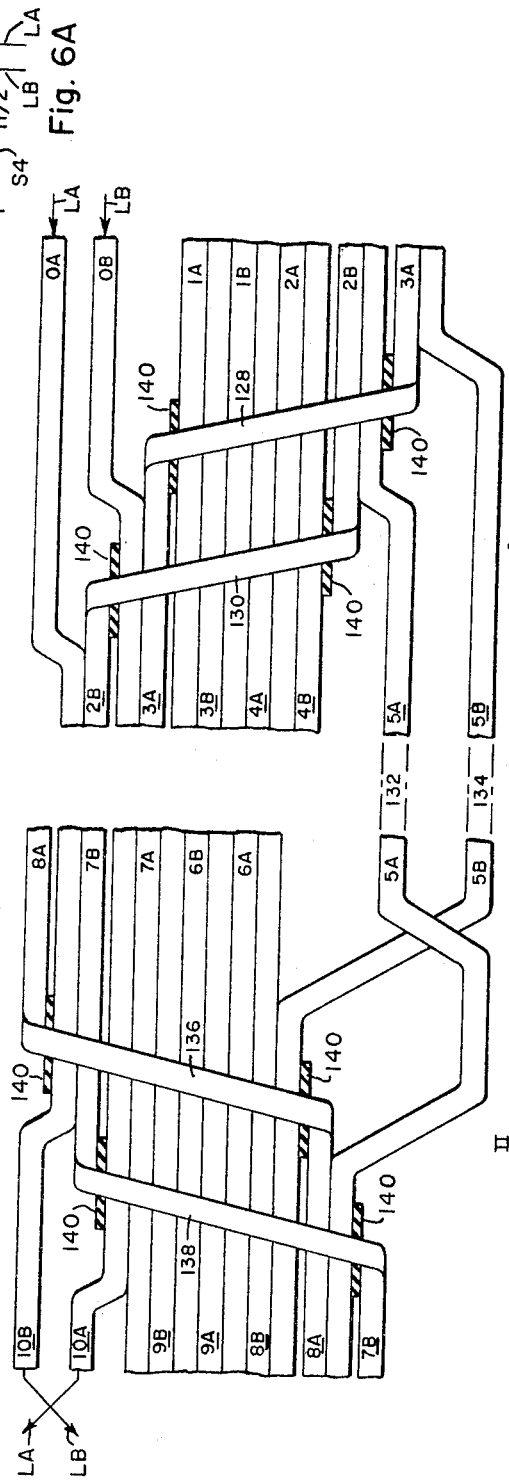
Fig. 6
Fig. 6A
Fig. 7

Oct. 11, 1966     G. M. STEIN     3,278,879
INTERLEAVED SERIES SECTIONS IN PANCAKE COILS
Filed June 16, 1964     12 Sheets-Sheet 5
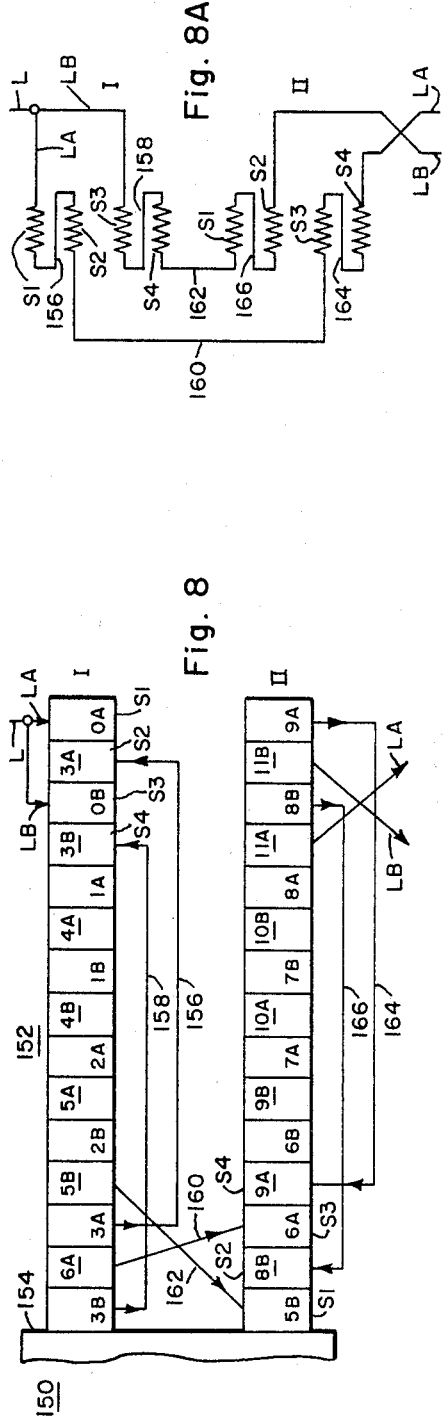
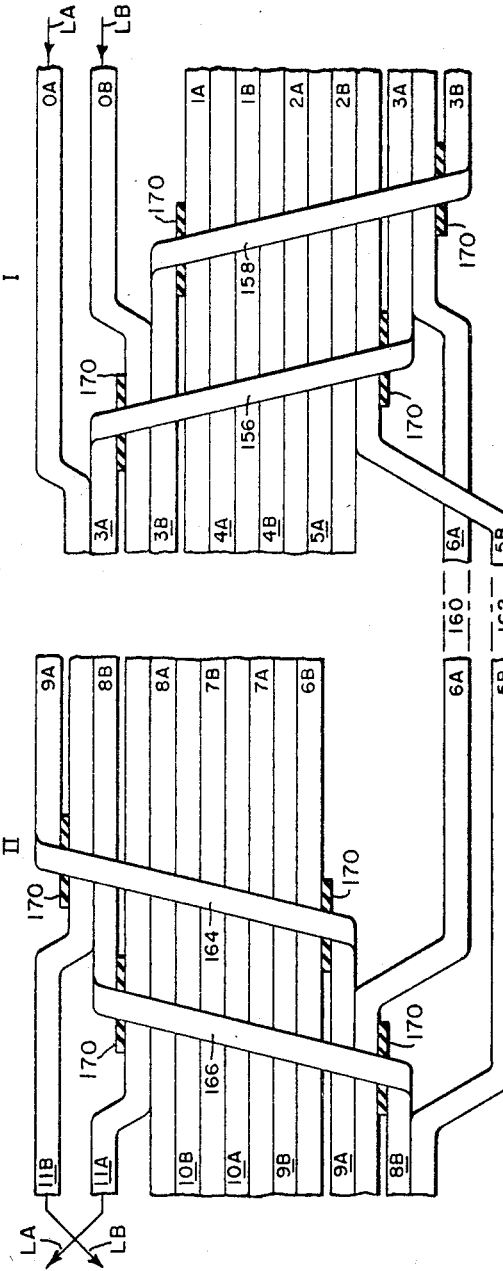

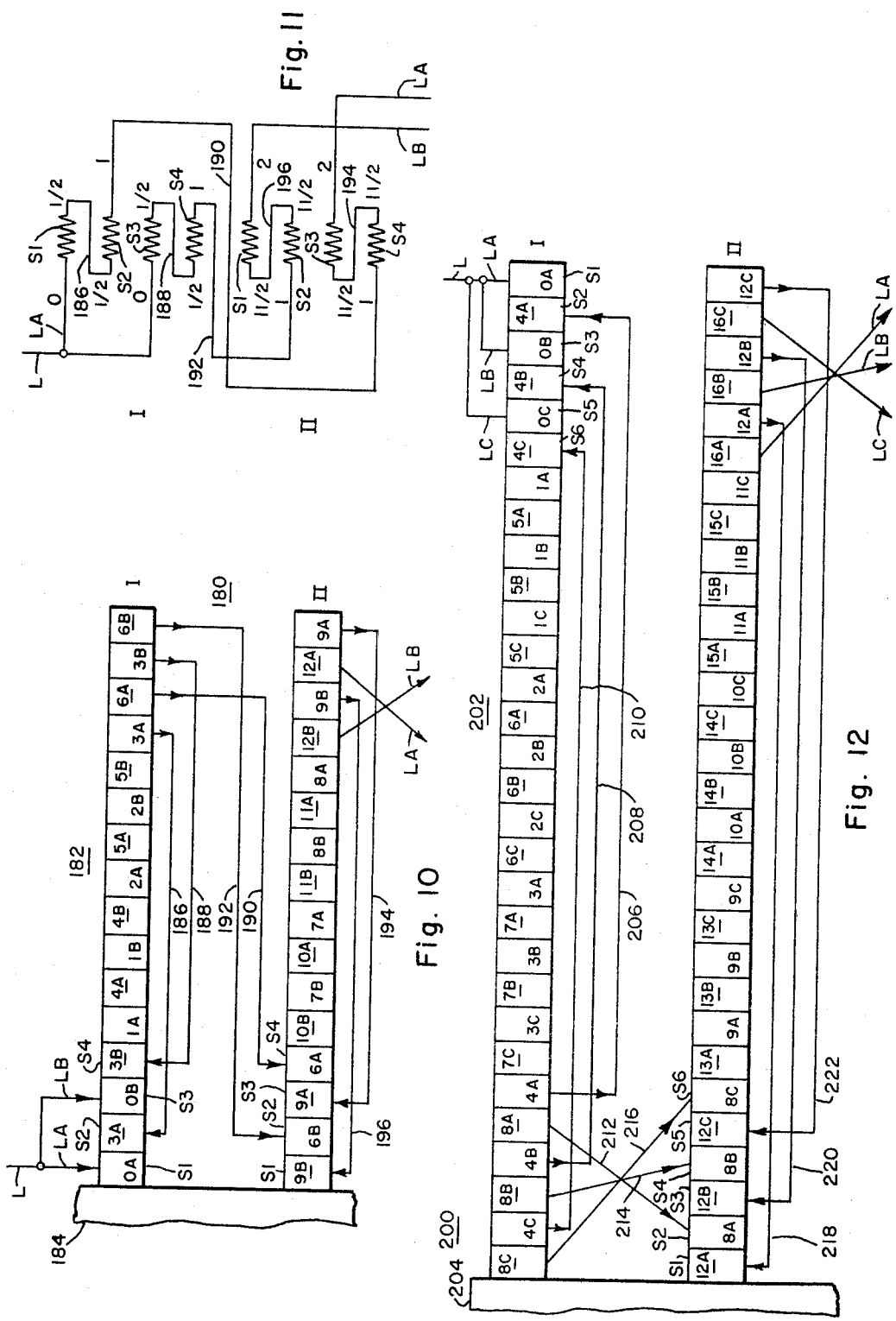

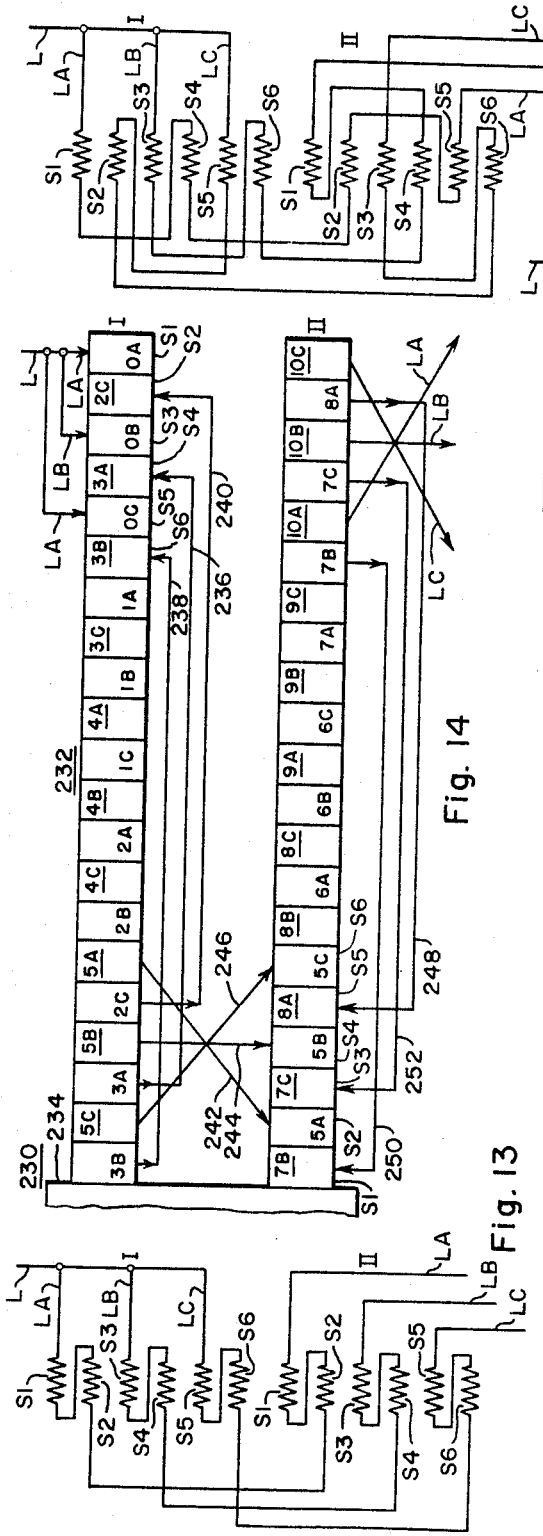
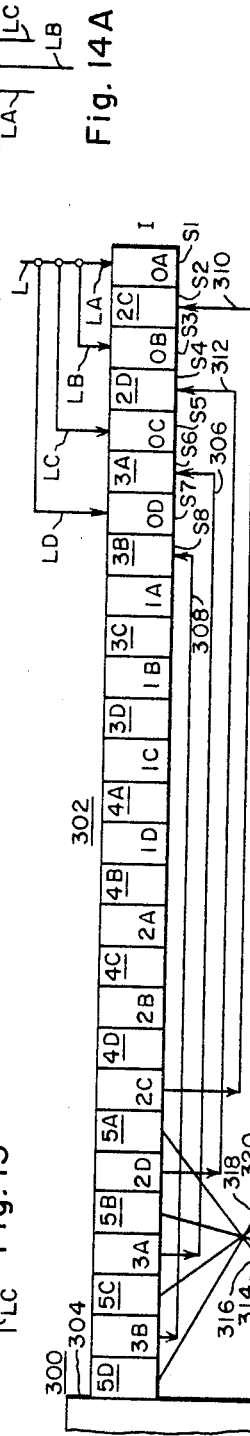
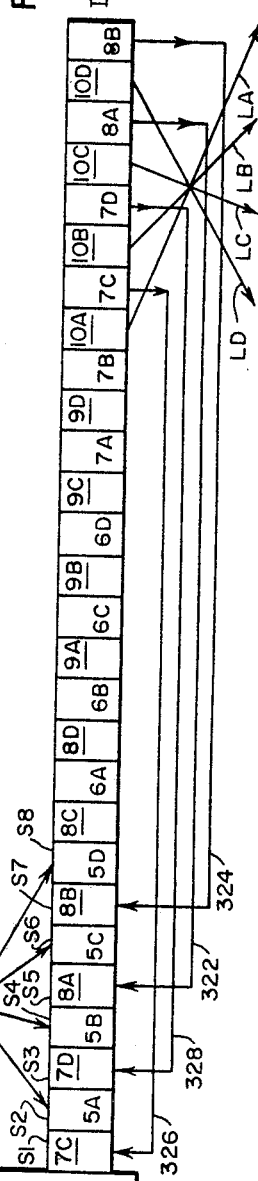
Fig. 14A
Fig. 14
Fig. 13
Fig. 17

Oct. 11, 1966 G. M. STEIN 3,278,879
INTERLEAVED SERIES SECTIONS IN PANCAKE COILS
Filed June 16, 1964 12 Sheets-Sheet 8

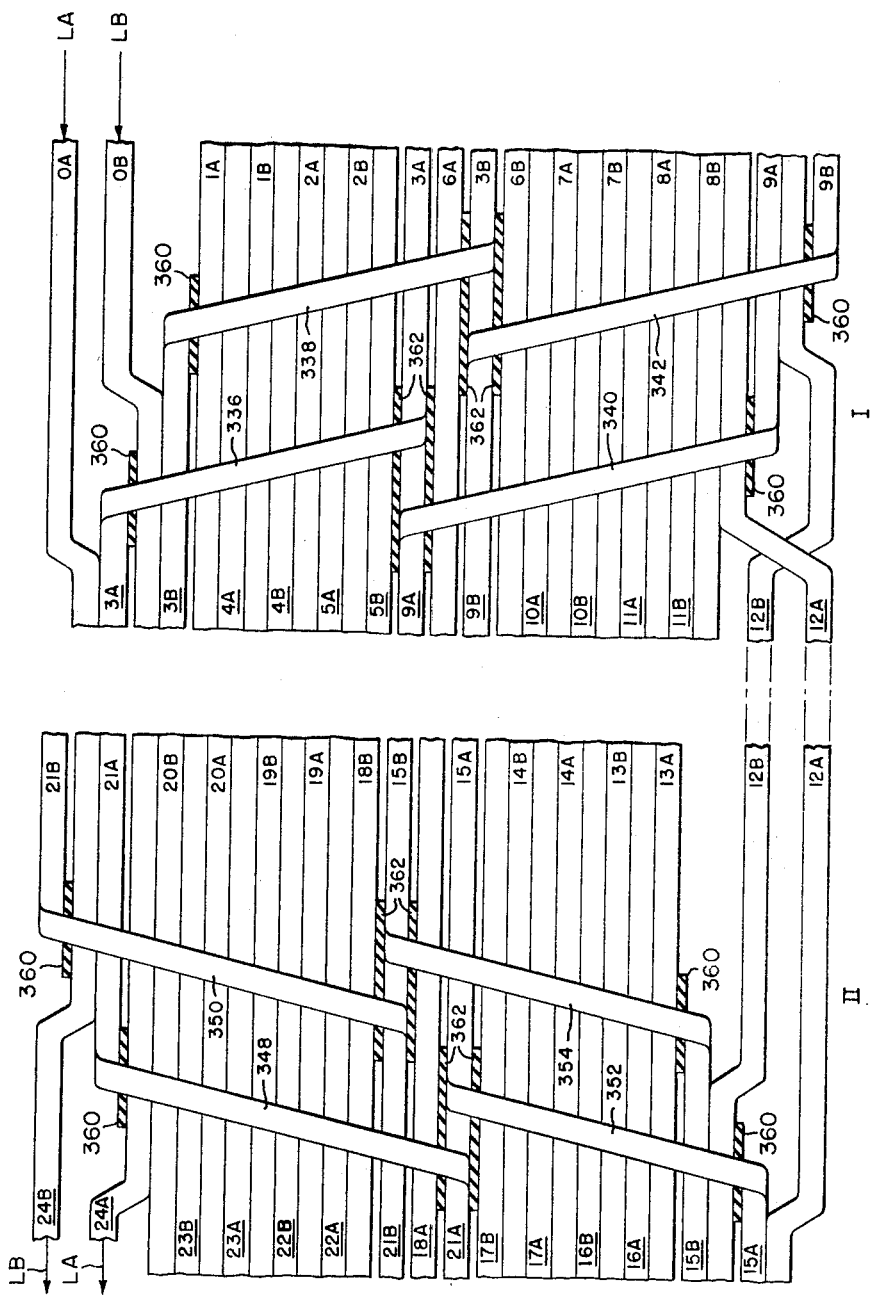

United States Patent Office 3,278,879
Patented Oct. 11, 1966

3,278,879
INTERLEAVED SERIES SECTIONS IN PANCAKE COILS
Gerhard M. Stein, Sharon, Pa., assignor to Westinghouse Electric Corporation, East Pittsburgh, Pa., a corporation of Pennsylvania
Filed June 16, 1964, Ser. No. 375,489
18 Claims. (Cl. 336—187)

This invention relates in general to electrical inductive apparatus, such as transformers, and more particularly to windings for electrical inductive apparatus.

Windings for electrical apparatus, such as transformers, are subjected to voltage waves and surges produced by lightning. These voltage surges generally have very steep wave fronts, and may damage the electrical equipment due to excessive voltage stresses produced in the windings, unless the windings are designed to withstand such stresses. Merely adding electrical insulation to the areas subjected to the abnormal voltage stresses, however, results in increasing the size, weight, and cost of the electrical apparatus. A better approach is to prevent the voltage stress from concentrating in a small section or sections of the winding. It is characteristic of the voltage surge to concentrate at the line end of the winding and rapidly attenuate as it enters the winding. This non-linear voltage distribution is produced between the coils, as well as between the coils and ground. It is desirable to distribute the voltage evenly across the winding. By distributing the voltage stress evenly throughout the winding, the stress at each section of the winding is only slightly increased, allowing a minimum amount of electrical insulation to be utilized.

When a voltage wave or surge is applied to an electrical winding, the initial voltage distribution across the winding is determined solely by the capacitance of the conductors and insulation which make up the winding. The final voltage distribution across the winding is determined inductively. It is not only important that the initial voltage be evenly distributed across the winding to prevent increasing the stress greatly in small sections of the winding, but it is important that the initial and final voltage distributions across the winding be substantially the same in order to prevent transient voltage surges from being produced as the voltage distribution changes from capacitive to inductive. The greater the difference between the initial and final voltage distributions, the greater the transient voltage oscillations produced. Thus, by evenly distributing the initial voltage across the winding, concentrated stress areas are eliminated, as well as harmful transient voltage oscillations. This is not only important for abnormal surges caused by lightning, or other causes, but is also important in very high voltage windings each time the winding is energized.

In order to distribute the initial voltage evenly across the winding, the distribution constant $\alpha$ must be as small as possible. The distribution constant $\alpha$ is determined by the square root of the ratio of the ground capacitance of the winding to the series capacitance of the winding, $$\alpha = \sqrt{\frac{C_g}{C_s}}$$

in which $C_g$ is the ground capacitance of the winding and $C_s$ is the series capacitance of the winding. It will be learned from observing the formula, that the distribution constant $\alpha$ may be made smaller by increasing the series capacitance $C_s$ of the winding. The series capacitance of a winding may be increased by inserting a predetermined number of conductor turns in series circuit relation between electrically adjacent conductor turns of the various coils which make up the overall winding. For purposes of clarity and simplicity, the individual coil sections which comprise the overall winding will be referred to hereinafter as disc or pancake coils, terms which are well known in the art, and the process of inserting a certain number of series connected turns between electrically adjacent turns will be referred to as interleaving. The interleaving increases the voltage between the turns, which requires an increase in the electrical energy between turns and a corresponding increase in the series capacitance of the total winding. Interleaving conductor turns effectively connects the turn-to-turn capacitances in parallel, thus increasing the series capacitance of the coil. To obtain the maximum series capacitance, and thus the best possible distribution of the initial voltages across each coil of the winding for a given maximum turn-to-turn stress, it is important that the conductor to conductor stress between the conductors of each coil be substantially the same. Since the stress inevitably decreases from the line end towards the interior of the windings it is not practical to strive for the same conductor to conductor stress in every coil of the winding. Excellent results, however, are obtainable if the conductor to conductor stress in each individual coil is substantially the same. Thus, all spaces between the conductors are used for the maximum possible storage of electrical energy and the maximum series capacitance of the winding is produced. It also follows that increasing the number of turns per coil increases the series capacitance, as there are more spaces to store energy and thus more individual capacitances connected in parallel, plus the fact that the more turns in the coil the more turns in series will be placed between physically adjacent turns, which increases the turn-to-turn stress and increases the capacitance of the winding.

When a winding is to carry high currents, it is better to utilize two or more conductors connected in parallel circuit relation, instead of one large conductor. It is also desirable to interleave the parallel connected conductors to obtain the maximum series capacitance for the winding for a given maximum turn-to-turn stress. Further, the interleaving should be accomplished without introducing mechanical shearing stresses between the conductors which would necessitate strategic placement of extra insulation to avoid mechanical failure. Still further, the electrical arrangement of the various pancake coils should be such that large turn-to-turn voltage stresses are not produced due to the normal line voltage itself, as the amount of extra insulation required to insulate against the stresses increases more rapidly than the greater series capacitance produced by the higher turn-to-turn stress. Thus, it is desirable to produce a high current winding for inductive apparatus having two or more parallel connected conductors, in which the maximum series capacitance is produced for a given maximum turn-to-turn stress, and with the mechanical interleaving arrangement being such that a minimum of insulation is required at the interleaving points.

Accordingly, it is an object of the invention to provide a new and improved winding for electrical inductive apparatus.

Another object of the invention is to provide a new and improved winding for electrical inductive apparatus in which the turn-to-turn stress is substantially the same in each coil of the winding.

Still another object of the invention is to provide a new and improved winding for electrical inductive apparatus in which the initial voltage distribution is as linear as possible.

A further object of the invention is to provide a new and improved winding for electrical inductive apparatus in which the initial and final voltage distributions across the winding are substantially the same.

Another object of the invention is to provide a new and improved winding for electrical apparatus having two or more conductors connected in parallel and interleaved to provide a maximum series capacitance for the winding for a given turn-to-turn stress.

A further object of the invention is to provide a new and improved winding for electrical inductive apparatus which requires a minimum amount of electrical insulation, is of minimum size, and utilizes interleaving of parallel connected conductors without introducing mechanical shearing stresses at the interleaving points.

Briefly, the present invention accomplishes the above cited objects by winding a pancake coil with two or more parallel connected conducting strands and separately interleaving each parallel connected conducting strands back through the pancake coil. In other words, each parallel connected conducting strand spirally traverses each pancake coil at least twice. This interleaving is performed so that the stress between mechanically adjacent conductors is not only increased, but is also substantially the same or uniform, producing a maximum series capacitatnce for a given conductor-to-conductor stress. Further, each parallel connected conductor progresses serially throughout each pancake coil and serially from each pancake coil to the adjacent pancake coil. Thus, the plurality of conductors are electrically connected to each other only at the start and finish of the winding. They progress serially completely throughout the entire winding once they leave the start of the winding until they reach the finish of the winding. Each conductor is interleaved with itself and with each of the other conductors in each pancake coil, producing a winding in which the stress between adjacent turns is large enough to provide the desired series capacitance for the number of turns utilized, but is still small enough that the amount of insulation required does not offset the advantages gained by the higher series capacitance.

The particular interleaving arrangement employed provides spaces or openings for the interleaving connections to prevent mechanical shearing stresses between the interleaving connections and adjacent conductors, and automatically aligns the connections between adjacent pancake coils so that the interconnections are as short as possible and may easily be made.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIGURE 1 schematically compares the winding arrangement produced according to the principles of this invention with a typical prior art winding arrangement;

FIG. 2 is a diagrammatic view illustrating a winding arrangement embodying the teachings of this invention;

FIG. 3 is a schematic representation of the winding arrangement illustrated in FIG. 2;

FIGS. 4 and 4A are diagrammatic and schematic views illustrating another winding arrangement embodying the teachings of this invention;

FIG. 5 is a side view of the winding arrangement shown in FIG. 4, illustrating the interleaving connections and connections between adjacent pancake coils which make up the winding;

FIGS. 6, 6A and 7 are diagrammatic, schematic, and side views, respectively, of another winding arrangement embodying the teachings of the invention;

Figure 15:
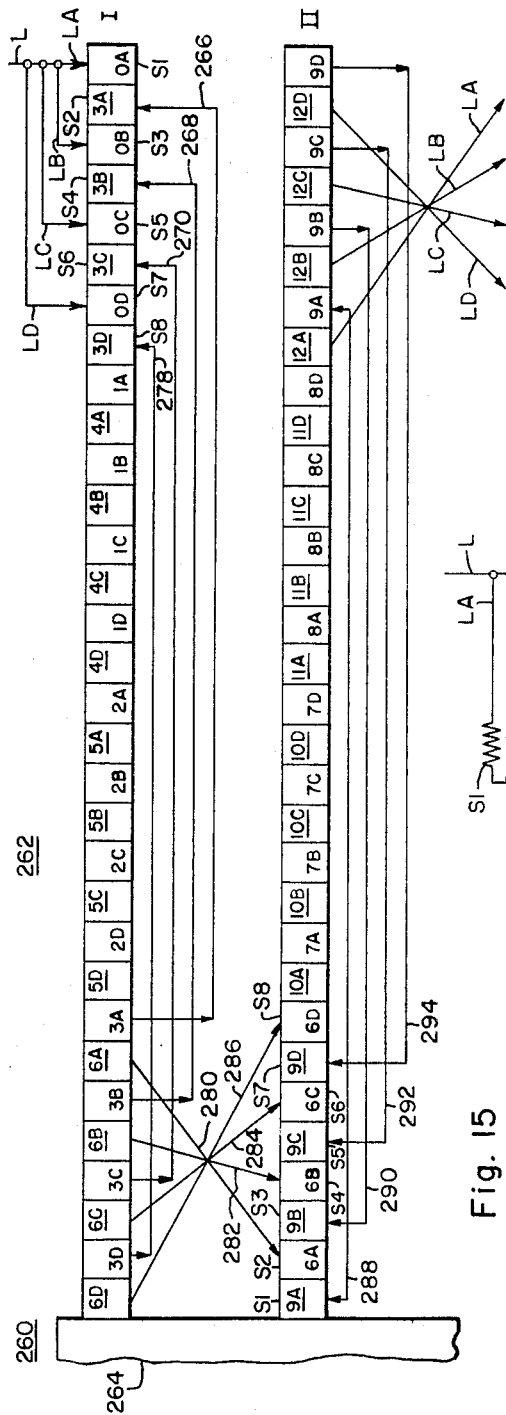
Figure 16:
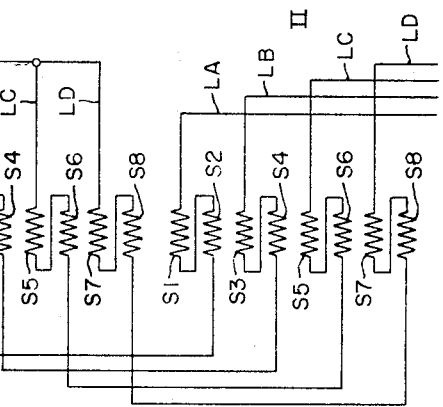
Figure 17A:
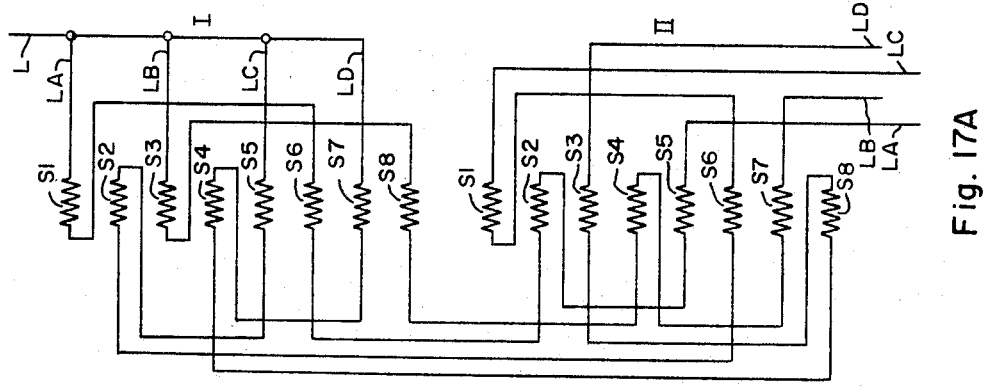
Figure 21:
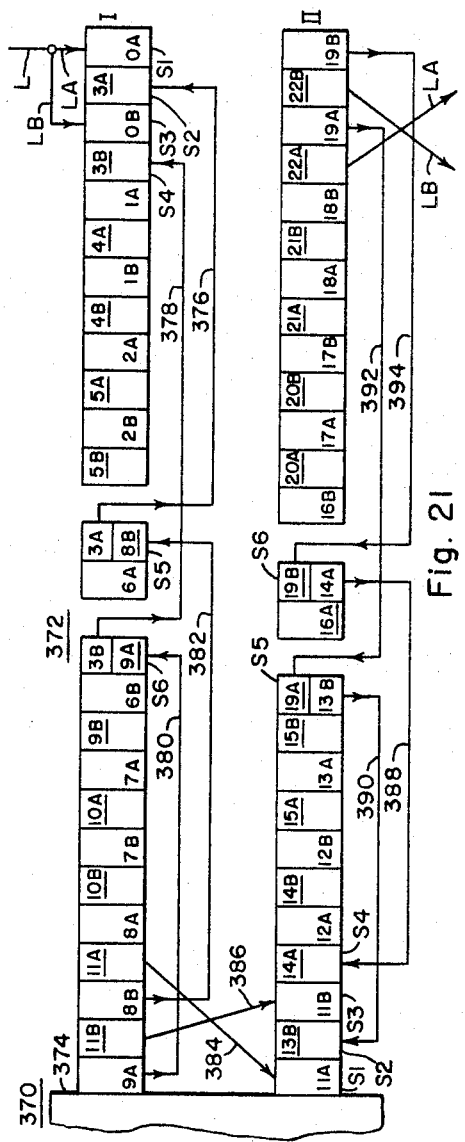
Figure 21A:
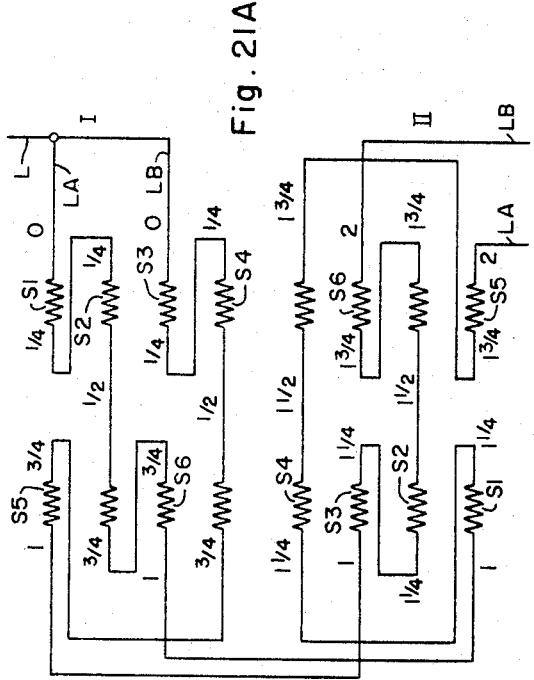
Figure 22:
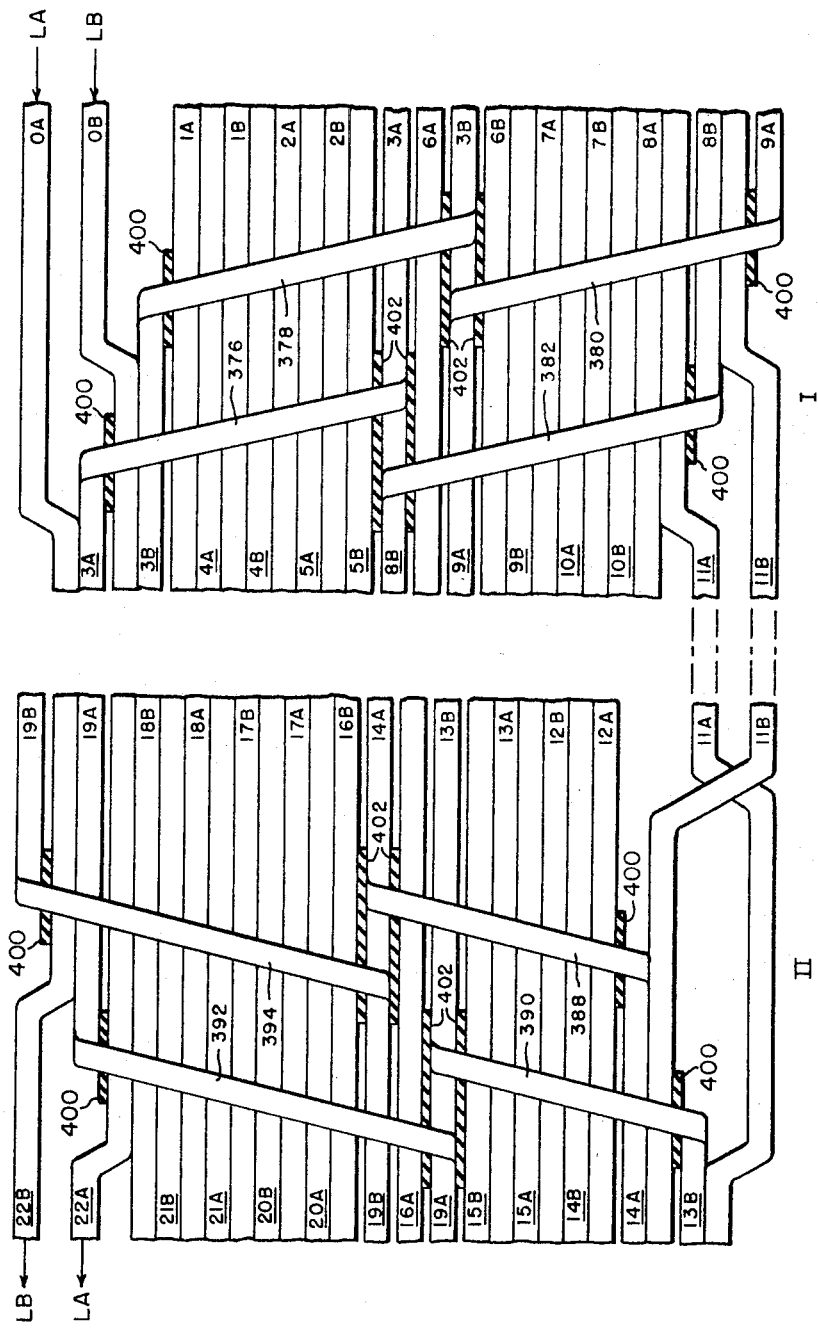
Figure 23:
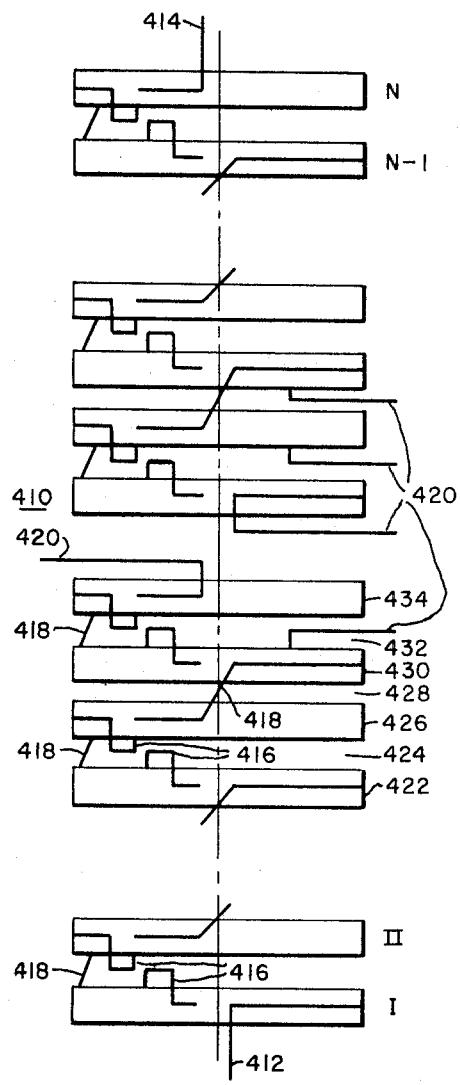
Figure 24:
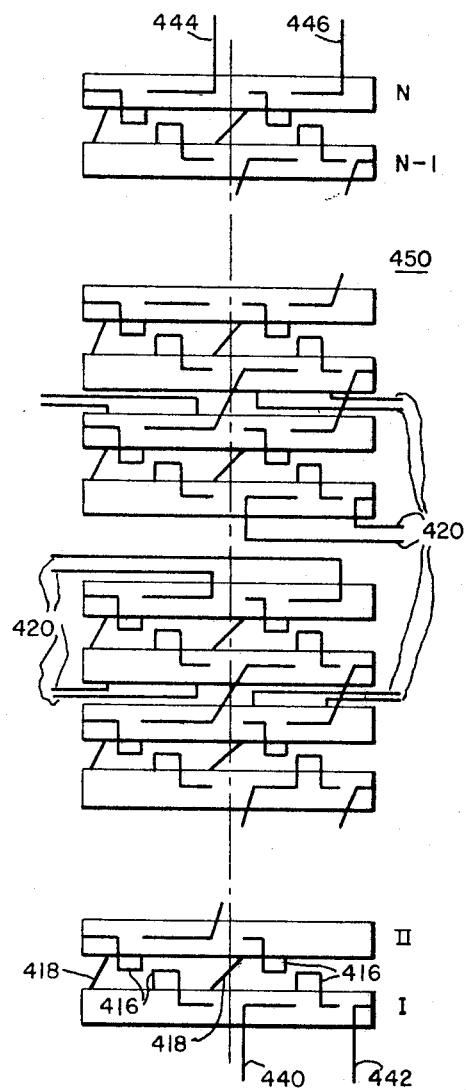

FIGS. 8, 8A, and 9 are diagrammatic, schematic and side views, respectively, of still another winding arrangement embodying the teachings of this invention;

FIGS. 10 and 11 are diagrammatic and schematic views, respectively, of another winding arrangement embodying the teachings of the invention;

FIGS. 12 and 13 are diagrammatic and schematic views, respectively, of another winding arrangement embodying the teachings of the invention;

FIGS. 14 and 14A are diagrammatic and schematic views of another winding arrangement embodying the teachings of the invention;

FIGS. 15 and 16 are diagrammatic and schematic views, respectively, of still another winding arrangement embodying the teachings of this invention;

FIGS. 17 and 17A are diagrammatic and schematic views of another winding arrangement embodying the teachings of this invention;

FIGS. 18, 19 and 20 are diagrammatic, schematic and side views, respectively, of another winding arrangement embodying the teachings of this invention;

FIGS. 21, 21A, and 22 are diagrammatic, schematic, and side views, respectively, of a winding arrangement embodying the teachings of this invention; and FIGS. 23 and 24 are diagrammatic representations illustrating another embodiment of the invention.

Referring now to the drawings, and FIG. 1 in particular, there is shown a schematic comparison of a winding constructed according to the teachings of this invention and a typical winding arrangement of the prior art. In the various views, the individual conductors are identified with capital letters, and the individual turns of each coil are identified with the letter of the appropriate conductor plus a number corresponding to the turn number in the coil. The second time a conductor spirals through the same coil, the individual turns are referenced with a letter and number, with a line below the letter-number combination. Individual disc or pancake coils are referred to with Roman numerals. The line connections of the individual conductors are indicated with the letter L before the letter applied to each individual conductor. Where the line connections are joined to form a single line conductor, it is designated the L conductor. Coils schematically shown vertically or horizontally adjacent one another indicate that the turns of those coils are interleaved. Further, the terms "start" and "finish" of a pancake coil are used throughout the specification and are well known in the art. The "start" of a coil is the inner portion, and the "finish" is the outer portion, so designated as when the strands are wound to form a pancake coil, a revolving mandrel may be used, with the coil turns starting at and building up from the mandrel surface until the desired radial build-up is reached, at which time the coil is finished. Thus, the terms "start" and "finish" of a pancake coil used herein refer to the conventional meanings. The individual coil sections which comprise a pancake coil also have start and finish ends, which may not always be at the conventional start and finish of the pancake coil. In order to avoid confusion, the start and finish ends of individual coil sections will always be referred to as the "entrance" and "exit" ends, respectively.

Referring again to FIG. 1, the prior art winding arrangement is divided into a LA conductor and a LB conductor. The LA conductor is singly interleaved to form a pancake winding, indicated by Roman numeral I. By single interleaving is meant the LA conductor spirals inwardly or outwardly, as the case may be, to form a plurality of turns, and then loops back to again spiral in the same direction, with the turns formed during the second spiral, interleaving with the turns formed during the first spiral. In like manner, the LB conductor is singly interleaved to form a second pancake coil, indicated by Roman numeral II. The LA and LB conductors are then joined at 30 to again form the L conductor. The L conductor again divides to form a LA and LB conductor and pancake coils III and IV are formed, as hereinbefore described relative to pancake coils I and II. This sequence may be continued to form the desired number of pancake coils. Thus, each pancake coil I through IV is formed by one conductor, and two adjacent pancake coils are connected in parallel circuit relation with each other with respect to the ends of the overall winding, and the parallel connected pancake coils are connected in series circuit relation with one another. Assuming the unit voltage across the overall winding to be 1, it is important to note that the voltage across each interleaved portion of each pancake coil is ¼, and the voltage across each pancake coil is ½.

The schematic portion of FIG. 1 referenced "new" illustrates a winding constructed according to the teachings of this invention, with the L conductor dividing into LA and LB conductors, similar to the prior art portion of FIG. 1. The LA conductor and LB conductor are both interleaved in each of the pancake coils, however, with the LA conductor being interleaved with itself in pancake coil I, the LB conductor being interleaved with itself in pancake coil I, and the LA and LB conductors being interleaved with one another in pancake coil I. This same description also applies to the remaining pancake coils II through IV. Another distinguishing feature, disregarding any tap connections, is the fact that each conductor, LA and LB, proceeds serially through the entire winding, not rejoining one another until the entire winding has been completed. Assuming the unit voltage across the entire winding is one, it will be observed that the voltage across each interleaved portion of each pancake coil is ⅛ and the voltage across each pancake coil is ¼. It will be remembered that the voltage across each interleaved portion and across each pancake coil of the prior art winding was ¼ and ½, respectively, or twice the voltage of the winding constructed according to the teachings of this invention. This points out an important disadvantage of the prior art winding, the voltage stress across the coil and thus across individual conductors is so high that the extra insulation required may defeat the advantage gained by the high series capacitance of the winding. A winding constructed according to the teachings of this invention has the same number of pancake coils, with the same quantity of conducting material in each coil, but the individual conductors of the prior art winding must be insulated for a much higher voltage. Then, when the turns of the prior art winding are interleaved to obtain a high series capacitance and even distribution of the initial and surge voltages, the amount of insulation required more than offsets the advantages gained by the high series capacitance. A winding constructed according to the teachings of this invention does not have this disadvantage, allowing the turns to be interleaved to obtain a large series capacitance and insuring that the conductor-to-conductor stress is the same between all conductors of the winding, without increasing the turn-to-turn stress to a point where the insulation required offsets the advantages produced by the high series capacitance.

FIGS. 2 and 3 illustrate, diagrammatically and schematically, respectively, one embodiment of the invention in which two conductors are each interleaved to form a winding having four pancake or disc coils I through IV. It will be understood that in all of the various figures, that more or less pancake coils may be utilized. Also, many more turns may be utilized in an actual coil than shown. As hereinbefore stated, the more turns per coil that are utilized, the higher the series capacitance of the coil.

FIG. 2 represents a portion of a transformer 32 of the core form type, in section, to illustrate the interleaving of the various conductors in detail. It is not necessary to show all of the phase windings if the transformer is polyphase, or even all of one phase winding, as each phase is similar to all of the phases, and each winding is symmetrical about its center line. The transformer 32 comprises a high voltage winding 33 formed from a plurality of pancake type high voltage coils I through IV spaced axially apart from one another in a stacked arrangement. In other words, the openings in the coils which make the high voltage winding 33 have their openings in substantial registry. High voltage winding 33 is disposed inductive relation with a low voltage winding and magnetic core, designated generally at 34. As hereinbefore stated, only half of the high voltage winding 33 is illustrated, with the portion not shown being similar to and symmetrical with the portion shown.

Each pancake coil comprises a plurality of turns and may be wound with at least first, second, third and four electrically insulated conductor strands, each having an entrance and an exit end, spirally wound together about a common axis to form first, second, third and four coil sections, with each strand appearing as every four turn of the pancake coil. In other words, the individual conducting strands are interleaved with one another in sequential pattern. The alternation or interleaving of the individual conducting strands increases the voltage stress between conductor turns and makes the stress between individual turns substantially the same throughout the coil. The increased voltage stress between adjacent turns and the fact that the voltage stress is uniform from conductor-to-conductor in each pancake coil, assures maximum storage of electrical energy between the turns and therefore the maximum number of individual capacitances connected in parallel which produces the maximum series capacitance of the winding for a given maximum turn-to-turn voltage stress.

After the pancake coil is wound, a certain two of the coil sections are electrically connected to form the A circuit, and the remaining two coil sections are electrically connected to form the B circuit. The coil sections start at the outer or "finish" portions of pancake coils I and III and at the inner or starting portions of pancake coils II and IV, with the entrance turn of each coil section being indicated with the letters and a reference numeral corresponding to the section number. For example, pancake coil I, the A circuit is completed by connecting the exit or innermost turn of the first section to the entrance or outermost turn of the second section by conductor 40, thus connecting the two coil sections in series circuit relation. The B circuit is completed by connecting the exit or innermost turn of the third coil section with the entrance or outermost turn of the fourth coil section by conductor 42. In pancake coil I, the first coil section enters the outer portion of the pancake coil at the outermost turn, the second section enters at the physically adjacent or second turn from the outside, the third section enters at the third turn from the outside and the fourth section enters at the fourth turn from the outside.

In like manner, conductors 44, 48 and 52 complete the A circuit in pancake coils II, III and IV, and conductors 46, 50 and 54 complete the B circuit in pancake coils I, III and IV, respectively. The A circuits in the various pancake coils are serially connected by conductors 56, 60 and 64, and the B circuits in the various pancake coils are serially connected by conductors 58, 62 and 66.

In particular, the A circuit in pancake coil I starts with line conductor LA entering section 1 at what is normally called the "finish" end of the coil at entrance turn O, and spirals inwardly appearing at every fourth turn, with every fourth turn being numbered consecutively. At turn 6A, the first coil section ends and the A circuit is continued via conductor 40 which connects the exit end of the first coil section at turn 6A to the entrance end of the second section at turn 6A. Since the turns at either end of conductor 40 differ in potential only by the negligible drop across conductor 40, they are both designated 6A. This practice is followed throughout the specification. From turn 6A, which is the entrance turn of the second section, the A circuit makes its second pass through pancake coil I, spiraling inwardly, again appearing at every fourth turn until the exit end of the second section is reached at turn 12A at the inner portion of the coil, or the portion normally referred to as the "start" end of the coil. The A circuit continues from the exit end of the second section of pancake coil I to pancake coil II through conductor 56, with conductor 56 entering pancake coil II at the entrance end of the first section of pancake coil II. In pancake coil II, the sections start at the inner portion of the coil, with section 1 starting at the entrance end of the innermost turn, section 2 starting at the entrance end of the next or second turn, section 3 starting at the entrance end of the third turn, and section 4 starting at the entrance end of the fourth turn. This connection is normally termed a "start-start" connection in the art. The turns at either end of conductor 56 are both designated 12A because they are at the same potential. The A circuit makes its first pass through pancake coil II following coil section 1, spiraling outwardly appearing at every fourth turn until the exit end of section 1 is reached at turn 18A, at which point conductor 44 returns the A circuit from the exit end of section 1 to the entrance end of section 2 at turn 18A, with the A circuit again spiraling outwardly following coil section 2 until the exit end of section 2 is reached at turn 24A. The A circuit then traverses pancake coils III and IV in a manner as just described for pancake coils I and II, with a "finish-finish" connection between pancake coils II and III and a "start-start" connection between pancake coils III and IV.

The B circuit, which is electriclly connected in parallel with the A circuit with respect to the line L, is interleaved through the various pancake coils in a manner similar to the A circuit. More specifically, the B circuit enters pancake coil I from line conductor LB at turn OB at the entrance end of coil section 3. From turn OB at the entrance end of the third coil section, the B circuit spirals inwardly, following section 3, appearing at every fourth turn until the exit end of section 3 is reached at turn 6B at the opposite end of the winding. Conductor 42 brings the B circuit back from the exit end of section 3 to turn 6B at the entrance end of coil section 4. The B circuit then follows section 4, making its second pass through pancake coil I, spiraling inwardly until turn 12B is reached at the exit end of section 4. The B circuit is continued with a start-start connection to pancake coil II, starting from the exit end of section 4 in coil I and proceeding via conductor 58 to the entrance end of section 3 of coil II, with the turns in pancake coils I and II at either end of conductor 58 being designated 12B. The B circuit spirals outwardly, following section 3 and appearing at every fourth turn until turn 18B at the exit end of section 3 is reached. Conductor 46 returns the B circuit from the exit end of section 3 to turn 18B at the entrance end of coil section 4, and the B circuit again spirals outwardly following section 4 until turn 24B at the exit end of section 4 is reached. The B circuit continues from the exit end of section 4 to the entrance end of section 3 in pancake coil III. Pancake coil III is similar to pancake coil I, with its sections starting at the outer turns. After following coil sections III and IV through pancake coil III, the B circuit leaves the exit end of section 4 in pancake coil III and enters the start of pancake coil IV, which is similar to pancake coil II. After following coil sections 3 and 4 in pancake coil IV, the B circuit leaves the exit end of coil section 4 and either proceeds to other pancake coils or is connected to the A circuit, if the winding has been completed. If desired, the A and B circuits may be transposed between pancake coils, as illustrated in the figure. It will be observed that the current paths through the various sections of each pancake coil are all in the same direction so that the magnetic fields produced in each pancake coil are additive. As shown by the arrows in FIG. 3, the current paths reverse from pancake coil to pancake coil, as is customary in transformer coil design, since pancake coils I and III are wound starting from the outside or "finish" of the coil and pancake coils II and IV are wound starting with the inside or "start" of the coil. Therefore, the turns on alternate pancake coils are wound in opposite directions so that the current flow through all the pancake coils will be in the same circumferential direction to produce a winding in which the magnetic field is additive.

Assuming the unit voltage of each pancake coil to be 1, it will be observed in FIG. 3 that the voltage stress between adjacent coil sections never exceeds one-half unit, with the space between pancake coils being used as coolant ducts for cooling the windings, if desired. The individual coil sections are indicated with the letters in front of the section number to distinguish them from the unit voltages, and clearly shows how the coil sections are connected to form the A and B circuits in each pancake coil.

It will be observed that the A and B circuits run serially throughout the four pancake coils, with the A and B circuits being connected in parallel at the ends of the high voltage winding 33. It will also be observed that each pancake coil includes both the A and B circuits, with each circuit being interleaved once in each pancake. It should be noted that by observing the pattern of the difference in the turn numbers between physically adjacent turns that if the voltage between electrically adjacent turns is 1 unit, the interleaving has increased the voltage between physically adjacent turns on the average of 5.75 times. If more turns are connected in series between physically adjacent turns by utilizing more turns in the coil, this voltage increase may of course be made much higher.

FIG. 4 illustrates another embodiment of the invention, with FIG. 4 diagrammatically illustrating a portion of a transformer 80, which may be single or polyphase, having a high voltage winding 82 and a low voltage winding 84 disposed in inductive relation with magnetic core 86. Insulation 85 separates the windings and magnetic core from each other. High voltage winding 82 includes pancake coils I and II arranged in a stacked relation, with the pancake coils only having their right-hand sections shown for simplicity. Similar to the winding shown in FIG. 2, each pancake coil has an A and B circuit and each circuit has an even number of turns. However, it will be observed that the connecting conductors 44 and 46 in pancake coil II of FIG. 2 enter and leave coil II at a point "inside" the coil. In other words, there are still other turns between each end of the coil and the point where the interleaving connection enters and leaves the coil. For example, turn 12B is between turn 18B and the "start" of the coil II, and turn 24A is between turn 18A and the "finish" of coil II. It is desirable to have the interleaving connections to the coil be located at the outside and the inside of the coil, thus preventing conductors from passing on both sides of the interleaving connections. Since the interleaving connections are brought out sideways from each interleaved portion of the coil, shearing stresses may be generated between these connections and the adjacent conductors which require additional electrical insulation to avoid mechanical puncture of the insulation and consequent electrical failure. In order to keep the extra insulation to a minimum and also keep the connections between adjacent coils in substantial alignment, it is desirable to make the interleaving connections in an open space where no conductors pass outside these connections. FIG. 4, along with FIG. 5, illustrate how this may be accomplished. The first pancake coil I of FIG. 4 is interleaved similar to pancake coil I in FIG. 2. There are four coil sections starting at the outside portion of pancake coil I exactly as described in FIG. 2. The A circuit, through line conductor LA, enters the outermost turn of section 1 at the entrance end of turn OA, spiraling inwardly, following section 1, and appearing at every fourth turn until reaching the exit end of section 1 at turn 3A, at which point the A circuit is returned through conductor 88 to the first turn 3A at the entrance end of section 2, adjacent turn OA. The A circuit then spirals inwardly for the second time, following section 2 until reaching the exit end of section 2 at turn 6A. At turn 6A, the A circuit leaves pancake coil I and enters pancake coil II at the entrance end of turn 6A through conductor 92. Pancake coil II has four sections starting consecutively with the innermost turn at the inner portion of the winding, so it is important to note that instead of connecting the exit end of section 2 in pancake coil I to the entrance end of section 1 of pancake coil II, as in FIG. 2, the exit end of section 2 in pancake coil I is now being connected to the entrance end of coil section 2 in pancake coil II.

The B circuit enters pancake coil I through line conductor LB at the entrance end of coil section 3 at turn 0B, spiraling inwardly until reaching the exit end of coil section 3 at turn 3B, returning to the entrance end of coil section 4 at turn 3B through conductor 90, spiraling inwardly for the second time until reaching turn 6B at the exit end of coil section 4 and entering pancake coil II at the entrance end of coil section 4 at turn 6B, through conductor 94. It is important to note that the similarity between FIGS. 2 and 4 ends at this point, with the A and B circuits from coil I entering coil II at the entrance ends of sections 2 and 4, respectively, in FIG. 4 instead of at the entrance ends of sections 1 and 2 as shown in FIG. 2.

More specifically, in FIG. 2 the A circuit from the exit end of coil section 2 of pancake coil I enters pancake coil II at the entrance end of coil section 1 of pancake coil II, and the B circuit at the exit end of coil section 4 of pancake coil I enters pancake coil II at the entrance end of coil section 3. In FIG. 4, the A circuit from the exit end of coil section 2 of pancake coil I enters the entrance end of coil section 2 of pancake coil II, and the B circuit from the exit end of coil section 4 in pancake coil I enters the entrance end of coil section 4 in pancake coil II. This change may be more easily understood by comparing the schematic diagrams of FIGS. 3 and 4A. The effect of this change will become apparent as the A and B circuits through pancake coil II are traced. The A circuit spirals outwardly appearing at every fourth turn until turn 9A at the exit end of section 2 is reached, at which point the A circuit is brought back to turn 9A at the entrance end of section 1 via conductor 96. Hence, the interleaving connection to the turn 9A located at the entrance end of coil section 1 may be made without requiring extra insulation on both sides of the interleaving connection. The A circuit then spirals outwardly for the second time, appearing at every fourth turn until the exit end of coil section 1 at turn 12A is reached, at which point the A circuit may be connected to the entrance end of the first section of the next pancake coil, as shown in coil I, or the winding may be terminated.

The B circuit enters pancake coil II at turn 6B at the entrance end of coil section 4, and spirals outwardly until reaching the exit end turn 9B of coil section 4, at which point the B circuit returns to the entrance end of the third coil section of pancake coil II through conductor 98. It will be noted that the interleaving connection to turn 9B is made at the end turn 104 of pancake coil II, again allowing the interleaving connection to be made in the open, requiring extra insulation on only one side of the interleaving connection.

In summary, pancake coils I and II in FIG. 4 each comprise four individual coil sections. The four coil sections enter pancake coil I at its outer portion, are interleaved in sequence, and exit pancake coil I near its inner portion. The four coil sections enter the inner portion of pancake coil II and are interleaved in sequence until reaching the outer portion of pancake coil II. In pancake coil I, sections 1 and 2 are electrically connected and sections 3 and 4 are electrically connected, thus creating two separate electrical paths through pancake coil I. In like manner, sections 2 and 1 of pancake coil II are electrically connected together, and sections 4 and 3 are electrically connected together, also forming two separate electrical current paths through pancake coil II. Thus, pancake coil I has two unconnected or "free" entrance ends of two coil sections and two unconnected or "free" exit ends of two coil sections. In like manner, pancake coil II has two unconnected or "free" entrance ends and two unconnected or "free" exit ends. The free exit ends of pancake coil I are electrically connected to the free entrance ends of pancake coil II and the free entrance ends of pancake coil I are electrically connected together and the free exit ends of pancake coil II are electrically connected together to form two parallel electrical paths through the winding.

To illustrate more clearly the advantages of the arrangement shown in FIG. 4, and illustrate the alignment of the connections on adjacent coils, a side view of a portion of pancake coils I and II is shown in FIG. 5, with like reference letters and numerals indicating like turns and conductors. As shown, extra insulation 106 is required on only one side of each interleaving connection, because of the open space immediately adjacent each connection which is created while the interleaving connections are made in such a way to keep the connections between adjacent pancake coils in alignment. It will be observed that in pancake coil II, interleaving connector 98 is connected to the outermost turn 9B at point 108 and interleaving connector 96 is made to the innermost turn 9A at point 110. As shown in FIG. 5, the connectors 88, 90, 96 and 98 may be formed from the same conductor that is used to form the coil turns. However, special connectors may be used if desired.

FIGS. 6, 6A and 7 illustrate the modification required if the A and B circuits each have an odd number of turns per pancake coil, instead of each having an even number of turns per pancake coil, as illustrated in FIGS. 2, 3, 4 and 5. FIG. 6 is a diagrammatic view illustrating a portion of a transformer 120 which may be single or polyphase, having a high voltage winding 122 and a low voltage winding 124 disposed in inductive relation with magnetic core 126. High voltage winding 122 includes pancake coils I and II, arranged in stacked relation, which have only the right-hand sections illustrated for simplicity. The A and B circuits each have five turns per pancake coil for purposes of illustration, however, it will be understood that the principles of this particular embodiment apply to any number of odd turns per circuit per pancake coil. Like the embodiments shown in FIGS. 2 and 4, pancake coil I has four interleaved sections entering the outside portion of the pancake coil and pancake coil II has four interleaved sections entering the inside portion of the pancake coil. The entrance end of each section is marked with an appropriate number, with every fourth turn from the entrance turn belonging to the same coil section.

The A circuit enters section 1 of pancake coil I at turn 0A through line conductor LA, and spirals inwardly appearing at every fourth turn until reaching turn 3A at the exit end of section 1. At turn 3A, the A circuit is returned through conductor 128 to the entrance end of section 4 of pancake coil I at turn 3A. The A circuit again spirals through coil I until reaching turn 5A at the exit end of section 4, at which point the A circuit leaves pancake coil I and enters pancake coil II at turn 5A, which is the entrance end of section 2 of pancake coil II, through conductor 132. Just as in FIG. 4, the A circuit enters pancake coil II at the entrance end of coil section 2 and spirals outwardly, appearing at every fourth turn until reaching the outermost turn 8A at the exit end of coil section 2. At turn 8A, the A circuit is returned via conductor 136 to turn 8A at the entrance end of coil section 3, and again spirals outwardly until reaching turn 10A at the exit end of coil section 3. At turn 10A, the A circuit leaves pancake coil II.

The B circuit enters section 3 of pancake coil I at turn 0B from line conductor LB, spirals outwardly until reaching turn 2B at the exit end of coil section 3, returns to turn 2B at the entrance end of coil section 2 through conductor 130, and traverses pancake coil I for the second time until reaching turn 5B at the exit end of coil section 2. The B circuit leaves pancake coil I from turn 5B through conductor 134, and enters pancake coil II at the entrance end of coil section 1 at turn 7B via conductor 138, and most turn of the coil, similar to FIG. 4, the B circuit spirals outwardly for the first time until reaching turn 7B at the exit end of coil section 4, returns to the entrance end of coil section 1 at turn 7B via conductor 138, and spirals outwardly the second time until reaching turn 10B at the exit end of coil section 4, at which point the B circuit leaves pancake coil II. It will be noted that the difference between FIG. 6, which illustrates a high voltage winding 122 having two circuits, each with an odd number of turns, and FIG. 4 which illustrates a high voltage winding 82 having two circuits, each with an even number of turns, is that in pancake coil I of FIG. 4, sections 1 and 2 are joined, in that order, to form the A circuit and sections 3 and 4 are joined, in that order, to form the B circuit. In pancake coil I of FIG. 6, sections 1 and 4 are joined, in that order, to form the A circuit, and sections 3 and 2 are joined, in that order, to form the B circuit. In pancake coil II of FIG. 4 sections 2 and 1 are joined, in that order, to form the A circuit and sections 4 and 3 are joined, in that order, to form the B circuit; in pancake coil II of FIG. 6 sections 2 and 3 are joined, in that order, to form the A circuit, and sections 4 and 1 are joined, in that order, to form the B circuit. This is shown even more clearly in the schematic diagram in FIG. 6A, with the individual coil sections being numbered to aid understanding. FIG. 6A also illustrates that if the unit voltage across each pancake coil is one, that the maximum voltage between adjacent coil sections is one-half unit.

The A and B circuits have changed places at the extreme inner and outer turns of pancake coil II. The connector 98 in pancake coil II of FIG. 4 is from the outermost turn 9B at the exit end of coil section 4 to the entrance end of the third coil section at turn 9B. The similar connector 136 in FIG. 6 is from the outermost turn 8A, which is the exit end of coil section 2, to the entrance end of the third coil section at turn 8A, and is thus in the A circuit instead of the B circuit. The same is true in FIG. 4 for the interleaving connection 96 from the exit end of the second section of coil II to the entrance end of coil section 1 at turn 9A. In FIG. 4 interleaving connection 96 is in the A circuit and in FIG. 6 the corresponding interleaving connection 138 is in the B circuit. However, it will be noted that in both FIGS. 4 and 6, the pancake coil II has interleaving connections at the extreme inner and outer turns where they are in the open. This is illustrated more clearly in FIG. 7, which shows a side view of the coils I and II of FIG. 6. It will be noted that extra insulation 140 is required on only one side of each interleaving connection while the connections between adjacent pancake coils are kept in alignment.

The teachings of the invention may also be applied to pancake coils having half turns per coil, and this embodiment is illustrated in FIGS. 8, 8A and 9. FIG. 8 shows a portion of a transformer 150, having a high voltage winding 152 disposed in inductive relation with a low voltage winding and a magnetic core, shown generally at 154. High voltage coil 152 includes pancake coils I and II, arranged in a stacked relationship, in which only the right hand side is shown for simplicity, with coil I having six turns of the A circuit and five turns of the B circuit and coil II having five turns of the A circuit and six turns of the B circuit. It will be understood that an actual transformer may have many more pancake coils as well as many more conductor turns per pancake coil.

The pancake coils I and II are similar to the pancake coils I and II in FIGS. 2, 4 and 6 in that each have four interleaved sections, with the four sections entering the outside portion of the coil in pancake coil I, and the inside portion of the coil in pancake coil II, as indicated with appropriate reference numerals in the figures. It will be observed that although line conductors LA and LB enter pancake coil I at the entrance ends of sections 1 and 3, respectively, similar to FIGS. 4 and 6, that the return interleaving connections of each circuit in pancake coil I exit from the ends of the first and third turns from the inner portion of the coil instead of the second and fourth turns from the inner portion, as in FIGS. 4 and 6. More specifically, line conductor LA enters pancake coil I at the entrance end of section 1, designated turn 0A, and spirals inwardly, appearing at every fourth turn until reaching turn 3A at the exit end of coil section 1, at which point the A circuit returns via conductor 156 to the entrance end of coil section 2 at turn 3A, adjacent turn 0A. The A circuit again spirals inwardly, appearing at every fourth turn until reaching turn 6A at the exit end of coil section 2, at which point the A circuit leaves pancake coil I and enters pancake coil II at turn 6A, which is the entrance end of coil section 3, via conductor 160. The A circuit then spirals outwardly through pancake coil II, appearing at every fourth turn, until turn 9A at the exit end of coil section 3 is reached, with the A circuit returning to the inner portion of the coil via conductor 164 to the entrance end of coil section 4 at turn 9A, and again spiraling outwardly to turn 11A at the exit end of coil section 4, at which point the A circuit leaves pancake coil II.

The B circuit enters pancake coil I at the entrance end of coil section 3 at turn 0B, spirals inwardly to the exit end of coil section 3, which is the innermost turn 3B, returns to the outside portion of pancake coil I to the entrance end of coil section 4 at turn 3B, via conductor 158, and again spirals inwardly until reaching turn 5B, at the exit end of coil section 4. The B circuit leaves pancake coil I via conductor 162 and enters pancake coil II at the entrance end of coil section 1 at turn 5B. The B circuit traverses pancake coil II twice, the first time returning from the exit end of coil section 1 at turn 8B, to conductor 8B at the entrance end of coil section 2, via conductor 166, and ending up at turn 11B at the exit end of coil section 2, at which point circuit B leaves pancake coil II. FIG. 8A is a schematic diagram of FIG. 8, and clearly shows how the coil sections are connected to form the A and B circuits.

FIG. 9 shows a side view of the pancake coils I and II shown in FIG. 8, illustrating that insulation 170 is required on only one side of each interleaving connection, and also shows the alignment of the connections between adjacent coils. When the desirable transposition is performed, the connections are in alignment.

The windings illustrated in FIGS. 2, 4, 6 and 8 have all had adjacent pancake coils connected with start-start and finish-finish connections. These connections have the advantage of making the connecting conductors as short as possible and keeps the number of conductors disposed across the entire length of the opening or duct between adjacent pancake coils to a minimum. However, there may be instances where it is desirable to connect adjacent pancake coils with finish-start connections, as this connection also possesses certain advantages. When adjacent pancake coils are start-start, finish-finish connected, as shown in FIGS. 2, 4, 6 and 8, pancake coil I and all other odd numbered or alternate pancake coils are hand wound, or they are first machine wound and rewound by hand, as the incoming line enters the pancake coil at what is normally the "finish" of a machine wound coil and hand winding is necessary in order to get the four sections of the pancake coil to start properly at the "finish" end of the coil. If all of the pancake coils are connected finish-start, all of the coils may be machine wound, without any hand winding, as the individual coil sections will always start at the normal "start" of the coil and the end of the coil sections will always be at the normal "finish" of the coil. The finish-start connection produces coils in which the current in each coil is always flowing in the same direction, instead of alternating directions between adjacent coils, as in start-start, finish-finish coils, and the maximum voltage stress between adjacent pancake coils when the coils are finish-start connected is less than the maximum voltage stress between adjacent pancake coils when they are start-start, finish-finish connected.

FIGS. 10 and 11 illustrate the principles of the invention applied to a transformer in which the coils of the high voltage winding are finish-start connected. In this instance, the sections of the coil always enter the inside portion of the coils, as referenced in the figure. More specifically, FIG. 10 shows a portion of a transformer 180 having a high voltage winding 182 including pancake coils I and II, disposed in inductive relation with a low voltage winding and magnetic core, shown generally at 184. Each pancake coil I and II has two parallel circuits, each containing an even number of turns, with only the upper half of the high voltage winding 182 being shown, for simplicity. In this embodiment, the line conductors LA and LB enter the normal "start" end of the pancake coil I, with the A circuit entering the entrance end of coil section I at turn OA and the B circuit entering the entrance end of coil section 3 at turn OB. Both circuits spiral outwardly until the A circuit reaches turn 3A at the exit end of coil section 1 and the B circuit reaches the exit end of coil section 3 at turn 3B, with the A circuit being returned to the entrance end of coil section 2 at turn 3A, and the B circuit being returned to the entrance end of coil section 4 at turn 3B, through conductors 186 and 188, respectively. The A and B circuits again spiral outwardly through pancake coil I until reaching the exit ends of coil sections 2 and 4 at turns 6A and 6B, respectively, at which turns the A and B circuits leave pancake coil I via conductors 190 and 192. If an inherent transposition of interconnecting conductors 190 and 192 is desired, the A circuit may enter pancake coil II at the entrance end of section 4 at turn 6A, and the B circuit may enter the entrance end of section 2 at turn 6B. Thus, pancake coil I is connected from its finish end to the start end of pancake coil II, with the conductors 190 and 192 continuing unbroken, if desired, from pancake coil I to pancake coil II. The A and B circuits each traverse pancake coil II twice, spiraling outwardly until reaching turns 9A and 9B at the exit ends of coil sections 4 and 2 respectively, returning to near the start of the coil via conductors 194 and 196 to the entrance ends of coil sections 3 and 1 at turns 9A and 9B, respectively, and again spiraling through pancake coil II until reaching turns 12A and 12B at the exit ends of coil sections 3 and 1. The A and B circuits may then be connected to the entrance ends of certain of the coil sections in the next pancake coil, or they may be connected together and connected to the line, if the winding has been completed. It will be noted that the circuit of FIG. 10 is similar to the circuit shown in FIG. 4, with each having two parallel conductors and with each having an even number of full turns per pancake coil. However, in order to get a normal transposition between pancake coils, it will be noted that the A circuit in coil II comprises coil sections 2 and 1, in that order, in FIG. 4, and coil sections 4 and 3, in that order, in FIG. 10, and that the B circuit of coil II is comprised of coil sections 4 and 3, in that order, in FIG. 4 and coil sections 2 and 1, in that order, in FIG. 10. Thus, the A and B circuits have been interchanged in FIGS. 4 and 10. It is to be understood, however, that if an inherent transposition is not desired that the A and B circuits may be interchanged.

FIG. 11 illustrates schematically the embodiment of the invention shown in FIG. 10. It will be understood that any of the embodiments shown herein may be finish-start connected or start-start, finish-finish connected.

When higher currents are to be carried by the winding, more than two conductors may be connected in parallel circuit relation. An embodiment of the invention wherein three conductors are connected in parallel circuit relation is shown in FIGS. 12, 13, 14 and 14A, with FIGS. 12 and 13 illustrating the instance where each parallel circuit has an even number of turns per pancake coil and FIGS. 14 and 14A illustrating the instance where each parallel circuit has an odd number of turns per pancake coil.

FIG. 12 illustrates a transformer 200 having high voltage winding 202, including pancake coils I and II, disposed in inductive relation with a low voltage winding and magnetic core, indicated generally at 204. In this embodiment, line conductor L is divided into three parallel connected line conductors LA, LB and LC, with each conductor being singly interleaved in each pancake coil before being connected to each other again to complete the parallel circuit. Only the right hand side of pancake coils I and II are shown, for purposes of simplicity, and it is to be understood that the high voltage winding may have any plurality of pancake coils and each circuit may have any plurality of even numbered conductor turns. Since FIG. 12 illustrates finish-finish, start-start connections, the coil sections enter the normal "finish" or the outside portion of the coil, with pancake coil I having six separate coil sections. Pancake coil II also comprises six sections, with each section entering the normal "start" or inner portion of the coil. The entrance end of each of the sections in each of the pancake coils is indicated in FIG. 12 with an appropriate reference numeral.

Line conductor LA enters turn OA at the entrance end of coil section 1 and spirals inwardly appearing at every sixth turn, until reaching turn 4A at the exit end of coil section 1, at which point the A circuit returns via conductor 206 to turn 4A at the entrance end of coil section 2. The A circuit again spirals inwardly through pancake coil I, appearing at every sixth turn until reaching turn 8A at the exit end of coil section 2, at which point the A circuit leaves pancake coil I and enters pancake coil II at the entrance end of coil section 2 at turn 8A, via conductor 212. The A circuit then spirals outwardly through pancake coil II, appearing at every sixth turn until reaching turn 12A at the exit end of coil section 2, returning via conductor 218 to the innermost turn 12A at the entrance end of coil section 1, and again spiraling outwardly until reaching turn 16A at the exit end of coil section 1, at which point the A circuit leaves pancake coil II, where it may be connected to another pancake coil arranged similar to pancake coil I, or it may be connected to the other circuit conductors to complete the parallel circuit if the winding has been completed.

In like manner, the B and C circuits traverse each pancake coil with the coil sections 3 and 4 being connected by conductor 208 to form the B circuit and coil sections 5 and 6 being connected by conductor 210 to form the C circuit in pancake coil I. The B and C circuits in pancake coils I and II are connected together in a start-start connection by conductors 214 and 216, respectively, with coil sections 4 and 3 being connected by conductor 220 to form the B circuit and coil sections 6 and 5 being connected by conductor 222 to form the C circuit in pancake coil II. It will be noted that this connection of sections in pancake coil II provides an inherent transposition when the conductors proceed to the next pancake coil. FIG. 13 is a schematic diagram of FIG. 12, and it clearly shows how the various coil sections are connected to form the A, B and C circuits.

FIG. 14 is similar to FIG. 12, with each pancake coil of the high voltage winding having six sections, except FIG. 14 illustrates three parallel circuits each having an odd number of turns per pancake coil instead of an even number of turns per pancake coil, as illustrated in FIG. 12.

FIG. 14 shows a portion of a transformer 230, having a high voltage winding 232 including pancake coils I and II disposed in inductive relation with a low voltage winding and magnetic core, indicated generally at 234. The line conductor L is divided into three separate line conductors, LA, LB and LC, with line conductor LA entering pancake coil I at the entrance end of section 1 at turn OA. The A circuit then spirals inwardly, appearing at every sixth turn until reaching turn 3A at the exit end of coil section 1, at which point the A circuit is returned via conductor 236 to the entrance end of coil section 4 at turn 3A, and again spirals through coil I until reaching the exit end of coil section 4 at turn 5A. The A circuit leaves pancake coil I via conductor 242 and enters pancake coil II at the entrance end of coil section 2 at turn 5A, in a start-start connection. The A circuit spirals outwardly through pancake coil II, appearing at every sixth turn until reaching turn 8A at the exit end of coil section 2, at which point the A circuit returns via conductor 248 to turn 8A at the entrance end of coil section 5. The A circuit again spirals outwardly through pancake coil II, until reaching turn 10A at the exit end of coil section 5, at which point it leaves pancake coil II.

In like manner, the B and C circuits are singly interleaved through pancake coils I and II, with sections 3 and 6 in pancake coil I being connected by conductor 238 to form the B circuit, and sections 5 and 2 being connected by conductor 240 to form the C circuit. Sections 4 and 1 of pancake coil II are connected by conductor 252 to form the B circuit and section 6 and 3 are connected by conductor 254 to form the C circuit. The B circuits in coils I and II are connected together via conductor 244 and the C circuits in pancake coils I and II are connected together via conductor 246. FIG. 14A is a schematic diagram of the winding arrangement, and by comparing FIGS. 13 and 14A, the difference in connections between the coil sections is readily apparent.

FIGS. 15, 16, 17 and 17A illustrate the teachings of the invention applied to pancake coils which have four parallel connected strands, or conductors, with each conductor being singly interleaved in each pancake. FIGS. 15 and 16 illustrate the instance where each conductor has an even number of turns per pancake coil, and FIGS. 17 and 17A illustrate the instance where each conductor has an odd number of turns per pancake coil. The pancake coils in FIGS. 15 and 17 each have eight individual coil sections, and since the connections between the coils illustrated are start-start, pancake coil I has the coil sections entering the outside portion or external circumference of the pancake coil, and pancake coil II has the sections entering the internal portion of the pancake coil.

FIG. 15 shows a portion of a transformer 260 having a high voltage winding 262, including pancake coils I and II, inductively disposed relative to a low voltage winding and magnetic core, indicated generally at 264. The line conductor L is divided into four separate line conductors LA, LB, LC and LD. Line conductors LA enter the "finish" end of pancake coil I at turn OA which is the entrance end of coil section I, and spirals inwardly, appearing at every eighth turn, until reaching turn 3A at the exit end of coil section 1 where it is returned via conductor 266 to turn 3A at the entrance end of coil section 2. The A circuit again spirals inwardly through pancake coil I, appearing at every eighth turn until reaching turn 6B at the exit end of coil section 2, at which point the A circuit leaves pancake coil I via conductor 280 and enters pancake coil II at the entrance end of coil section 2 at turn 6A. The A circuit then spirals outwardly through pancake coil II until reaching turn 9A at the exit end of coil section 2, at which point the A circuit is returned via conductor 288 to turn 9A and the entrance end of coil section 1, and the A circuit again spirals outwardly through pancake coil II until reaching turn 12A at the exit end of coil section 1, at which point the A circuit may proceed to the next pancake coil, which would be arranged similar to pancake coil I, or if the winding has been completed, the parallel circuit may be completed by connecting conductor LA to the other line conductors.

Circuits B, C and D proceed through pancake coils I and II in a manner similar to that just described for circuit A. The B circuit in pancake coil I is formed by connecting the third and fourth coil sections together, the C circuit is formed by connecting the fifth and sixth coil sections together and the D circuit is formed by connecting the seventh and eighth coil sections together. The B circuit in pancake coil II is formed by connecting the fourth and third coil sections together, the C circuit is formed by connecting the sixth and fifth coil sections together, and the D circuit is formed by connecting the eighth and seventh coil sections together, in that order. The B, C and D circuits all spiral inwardly in pancake coil I, appearing at every eighth turn, returning to the outside portion of the coil by interleaving connections 268, 270 and 278, respectively, again spiraling inwardly and appearing at every eighth turn, leaving pancake coil I at the normal "start" of pancake coil I via conductors 282, 284 and 286, respectively, from where they enter the "start" end of coil II, spiraling outwardly through pancake coil II to the "finish" end, returning to the "start" end via interleaving connections 290, 292 and 294, and again spiraling outwardly to the normal "finish" end of the coil at which point they leave pancake coil II and either proceed to the next pancake coil or are all connected together, if the winding has been completed. FIG. 16 is a schematic diagram of the winding arrangement shown in FIG. 15, and it clealy illustrates how the coil sections are connection to form the A, B, C, and D circuits.

FIG. 17 is similar to FIG. 15, with each pancake coil having eight sections, except each of the four circuits have an odd number of turns per pancake coil. More specifically, FIG. 17 shows a portion of a transformer 300 comprising a high voltage winding 302, including pancake coils I and II, disposed in inductive relation with a low voltage winding and magnetic core, shown generally at 304. The construction of pancake coils I and II follows the pattern established for FIG. 15, with the line conductor L being divided into four circuits represented by line conductors LA, LB, LC and LD. Line conductors LA, LB, LC and LD enter the "finish" end of pancake coil I starting at the entrance ends of the first, third, fifth and seventh coil sections at turns OA, OB, OC and OD, respectively. The A, B, C and D circuits then spiral inwardly, each appearing at every eighth turn until reaching the exit ends of coil sections 1, 3, 5 and 7, at which time they return via conductors 306, 308, 310 and 312, respectively, and are connected to the entrance ends of the sixth, eighth, second, and fourth sections, respectively. The A, B, C and D circuits again spiral inwardly, appearing at every eighth turn until reaching the exit ends of the sixth, eighth, second and fourth sections, respectively at which point they leave pancake coil I and enter pancake coil II via conductors 314, 316, 318 and 320 at the entrance ends of coil sections 2, 4, 6 and 8. These circuits then spiral outwardly through pancake coil II, appearing at every eighth turn until reaching the exit ends of coil sections 2, 4, 6 and 8, at which point the circuits return to the entrance ends of coil sections 5, 7, 1 and 3 via conductors 322, 324, 326 and 328, respectively. The circuits again spiral outwardly through pancake coil II, appearing at every eighth turn until reaching the exit ends of coil sections 5, 7, 1 and 3 at which point they leave pancake coil II to proceed to the next coil, where the connection of pancake coil I would be duplicated, or they may be connected together if the winding has been completed.

FIG. 17A illustrates schematically the arrangement shown in FIG. 17. The difference in connections between the arrangements shown in FIGS. 15 and 17 is very clear by examining and comparing their schematic diagrams in FIGS. 16 and 17A, respectively.

Thus, it has been shown that the principles of the invention may be extended to any number of separate parallel conductors. It is also possible to extend the principles of the invention to multiple interleaving of each conductor or circuit in each pancake coil. The arrangements heretofore shown and described have all utilized single interleaving of each circuit. In other words, each circuit traversed the pancake coil once and was brought out of the coil and returned to a portion of the coil it had already traversed, for it to again make its way through the coil. FIGS. 18, 19, 20, 21, 21A and 22 illustrate how each of the conductors may be doubly interleaved in each pancake coil. It is to be understood that the principles of the invention may also be utilized with more than two interleavings for each circuit in each pancake coil and also that more than two conductors may be interleaved more than twice, if desired.

FIGS. 18 and 20 illustrate two parallel conductors, doubly interleaved in each pancake coil, with each circuit in each pancake coil having an even number of turns. FIGS. 21 and 22 illustrate two parallel conductors, doubly interleaved in each coil, with each circuit in each coil having an odd number of turns. FIG. 19 schematically represents the arrangement of FIGS. 18 and 20, and FIG. 21A schematically represents the arrangement of FIGS. 21 and 22.

More specifically, FIG. 18 shows a portion of a transformer 330 having a high voltage winding 332, including pancake coils I and II, disposed in inductive relation with a low voltage winding and magnetic core, shown generally at 334. Pancake coil I has four sections which enter the outside portion of the pancake coil and two sections which enter the pancake coil near its midpoint, all spiraling inwardly. Pancake coil II has four sections which enter the inside portion of the pancake coil and two sections which enter near its midpoint, all spiraling outwardly. The line conductor L is divided into two circuits, A and B, represented by line conductors LA and LB, with circuit A entering the entrance end of coil section 1 at turn OA and spiraling inwardly, appearing at every fourth turn until reaching turn 3A which is the exit end of coil section 1 and which is located substantially in the mechanical center of pancake coil I. Thus, section 1 traverses substantially half of pancake coil I. At turn 3A, the A circuit returns via conductor 336 to the entrance end of coil section 2 at turn 3A, and again spirals inwardly appearing at every fourth turn and this time proceeding completely through pancake coil I to turn 9A at the exit end of section 2. At turn 9A, the A circuit returns via conductor 340 to the entrance end of section 5 at turn 9A, located substantially in the mechanical center of pancake coil I, and the A circuit again spirals inwardly, appearing at every fourth turn until reaching turn 12A at the exit end of section 5, at which point the A circuit leaves pancake coil I via conductor 344 and enters the entrance end of section 1 of pancake coil II at turn 12A. The A circuit then spirals outwardly in pancake coil II until reaching turn 15A at the exit end of section 1, located substantially in the mechanical center of pancake coil II. At turn 15A, the A circuit proceeds via conductor 352 to the entrance end of coil section 2 at turn 15A, and the A circuit again spirals outwardly appearing at every fourth turn until reaching the exit end of section 2 at turn 21A, returning via conductor 348 to the entrance end of coil section 5 at turn 21A located substantially at the mechanical center of pancake coil II, and again spirals outwardly until reaching turn 24A at the exit end of coil section 5, at which point the A circuit leaves pancake coil II and either proceeds to the next pancake coil, which would be arranged similar to pancake coil I, or is connected to the B circuit, if the winding has been completed. Thus, the A circuit traverses each pancake coil twice, but instead of accomplishing it in two steps, three steps have been utilized, with two interleaving connections being required per pancake coil.

The B circuit enters pancake coil I at the entrance end of coil section 3 and spirals inwardly until reaching turn 3B at the exit end of coil section 3, located substantially at the midpoint of pancake coil I. The B circuit returns via conductor 338 to the entrance end of section 4 at turn 3B, and again spirals inwardly until reaching turn 9B at the exit end of coil section 4. The B circuit returns via conductor 342 to the entrance end of coil circuit 6 at turn 9B, located substantially at the midpoint of pancake coil I, and again spirals inwardly to turn 12 at the exit end of coil section 6. A turn 12B, the B circuit leaves pancake coil I via conductor 346 and enters the "start" end of pancake coil II at turn 12B at the entrance end of coil section 3, spirals inwardly through pancake coil II until reaching turn 15B at the exit end of coil section 3, located substantially at the midpoint of pancake coil II, returns via conductor 354 to the entrance end of coil section 4 at turn 15B, again spirals outwardly through pancake coil II until reaching turn 21B at the exit end of coil section 4, returns via conductor 35 to the entrance end of coil section 6 at turn 21B, located substantially at the midpoint of pancake coil II, and spirals outwardly to turn 24B at the exit end of coil section 6, at which point the B circuit leaves pancake coil II.

Another way of considering the arrangement shown in FIG. 18 is to visualize each pancake coil being wound with four interleaved conductors, with the first and third conductors being cut substantially at their midpoints.

FIG. 20 shows a side view of the winding arrangement shown in FIG. 18. It will be noted that the interleaving connections at the inner and outer ends of the pancake coils I and II require insulation 360 on only one side of each connection. However, the inner interleaving connections near the midpoint of each pancake coil require insulation 362 on each side of the interconnecting joint, as it is not possible to arrange for these connections to be made at the outer portions of the coil.

FIG. 19 illustrates schematically the winding arrangement shown in FIG. 18. The connections of the various coil sections to form the A and B circuits may be more easily understood from this schematic diagram.

FIG. 21 is similar to the arrangement shown in FIG. 18, with each pancake coil having six sections as indicated except the two parallel circuits each have an odd number of turns per pancake coil. More specifically, FIG. 21 shows a portion of a transformer 370 which comprises high voltage winding 372, including pancake coils I and II, disposed in inductive relation with a low voltage winding and a magnetic core, shown generally at 374. Line conductor L divides into two circuits A and B, represented by LA and LB, with the A and B circuits entering pancake coil I at the entrance ends of coil sections 1 and 3 at turns OA and OB, respectively, spiraling inwardly, appearing at every fourth turn until reaching turns 3A and 3B at the exit ends of coil sections 1 and 3, located substantially at the midpoint of pancake coil I, returning via conductors 376 and 378, respectively, to the entrance ends of coil sections 2 and 4 at turns 3A and 3B, respectively, again spiraling inwardly until reaching turns 9A and 9B at the exit ends of coil sections 2 and 4, returning via conductors 380 and 382, respectively to the entrance ends of coil sections 6 and 5 at turns 9A and 8B, located substantially in the middle of pancake coil I, and again spiraling outwardly until reaching turns 11A and 11B at the exit ends of coil sections 6 and 5. At turns 11A and 11B, the A and B circuits leave pancake coil I via conductors 384 and 386 and enter the "start" end of pancake coil II at the entrance ends of coil sections 1 and 3 at turns 11A and 11B, respectively, spiraling outwardly to turns 14A and 13B, at the exit ends of coil sections 1 and 3, located at substantially the midpoint of pancake coil I, returning via conductors 388 and 390 to the entrance ends of coil sections 4 and 2 at turns 14A and 13B, respectively, spiraling outwardly to the exit ends of coil sections 4 and 2 at turns 19A and 19B near the finish end of pancake coil II, returning via conductors 392 and 394 to the entrance ends of coil sections 5 and 6 at turns 19A and 19B near the midpoint of pancake coil II, and again spiraling outwardly until reaching the exit ends of coil sections 5 and 6 at turns 22A and 22B. At turns 22A and 22B, the A and B circuits leave pancake coil II and proceed to the next coil, which would be arranged similar to pancake coil I. After the A and B circuits have traversed all of the coils making up the winding, they are joined together to complete the parallel path.

FIG. 21A illustrates schematically the arrangement shown in FIGS. 21 and 22, and a comparison between FIGS. 19 and 21A even more clearly illustrates the difference in connections required between an even number of turns per coil section per pancake coil and an odd number of turns per coil section per pancake coil. Assuming the voltage across each pancake coil to be one unit, the maximum voltage between adjacent coil sections is ¼ unit.

FIG. 22 is a side view of the pancake coils I and II shown in FIG. 21, illustrating how the connections between the two coils are in alignment after transposing the conductors, and that the outer interleaving connection only requires insulation 400 on one side of the joint. The inner interleaving connections, of course, require insulation 402 on both sides of the interleaving joint to prevent mechanical puncture of the insulation due to the shearing forces of the adjacent conductor turns.

It is to be understood that a winding may be constructed having a plurality of pancake coils in which the various degrees of interleaving are utilized to match the voltage stresses and insulation used. As taught in my copending application, Serial No. 222,559, filed September 10, 1962, and assigned to the same assignee as the present application, the interleaved winding may have its pancake coils divided into several zones with different insulation spacings between turns in the various zones. If the winding is ungrounded, the winding may be provided into three zones, two outer, or line end zones, and a central zone. The central zone may have pancake coils which have less insulation between turns than between the turns in the outer zones, and to offset the higher series capacitance in the central zone due to reduced insulation thickness, and therefore obtain a winding in which the series capacitance is uniformly distributed, the degree of interleaving of the pancake coils in the central zone may be reduced. In other words, in the central zone fewer turns are placed in series between electrically adjacent turns than in the outer zones. Thus, as an example, a winding may be constructed in which the two outer zones have pancake coils which utilize full thick insulation between turns and an interleaving arrangement as shown in FIG. 4, and the central zone may have pancake coils which have reduced insulation between turns and an interleaving arrangement as shown in FIG. 18.

If the winding is grounded, only two zones are required, with the outer zone next to the line having pancake coils using full thick insulation and interleaving arrangement such as shown in FIG. 4 and the zone next to the ground having pancake coils using less thick insulation and an interleaving arrangement such as shown in FIG. 18.

It will be noted that in all of the embodiments of the invention illustrated, that it is necessary to bring the interleaving connections or conductors through the ducts between the individual pancake coils. If each duct is used to carry such interleaving connections, as shown in the various views for simplicity, the overall size of the transformer may be increased, as the space taken in each duct for insulation purposes may be greater than the minimum clearance between sections required to withstand the electrical stresses. In other words, the space required to adequately electrically insulate the interleaving connections and also to mechanically protect the connections, may be substantially greater than the minimum duct size dictated by the voltage stress between adjacent pancakes. FIGS. 23 and 24 illustrate an arrangement which may substantially reduce the overall size of the transformer. Since one duct may easily take other interleaving connections placed side-by-side in the duct without increasing the duct size over that required for one interleaving connection, the interleaving connections from pancake coil to pancake coil may be alternated so that one duct contains all of the interconnecting conductors for two pancake coils. Thus, the intervening ducts are free of interleaving connections and may thus be reduced to the minimum duct size. Although the greatest savings in space will be utilized when applying this principle to "start-start," "finish-finish" connected coils, the principle could also be applied to "finish-start" connected coils even though space is required between all pancake coils for the finish-start connection.

FIG. 23 illustrates this teaching of alternately reversing the interleaving connections, showing a plurality of pancake coils, I through N, stacked similar to the way they would be stacked in an actual transformer to form a winding 410. The starting and finishing connections of winding 410 are shown at 412 and 414, respectively, the interleaving connections are indicated at 416, the interconnecting conductor between adjacent pancakes is indicated at 418, and winding taps are indicated at 420. For purposes of illustration consider pancake coils 422, 426, 430 and 434, which form ducts 424, 428 and 432. By locating the interleaving connections 416 from both pancake coils 422 and 426 in the same duct 424, and both interleaving connections 416 from pancake coils 430 and 434 in duct 432, duct 428 is free of interleaving connections and may be made a minimum size. Thus, throughout the winding, every other duct may be of minimum size, substantially reducing the overall size of the winding 410 and thus reducing the physical size of the transformer. The ducts which do not contain any interleaving connections may be filled with solid insulation, for example, an insulating washer, if not needed as a cooling duct. This would result in further reduction in the overall winding size.

FIG. 24 illustrates the same single interleaving arrangement as FIG. 23, except applied to a winding 450 which has two parallel conductors, starting at 440 and 442 and ending at 444 and 446, which doubles the number of interleaving connections 416. Like reference numerals in FIGS. 23 and 24 indicate similar components. This same principle may be applied to any number of conductors and single or multiple interleaving connections.

In order to reduce the labor required in making the interleaving connections 416, it may be advisable to place the interleaving connections which face coil N, for example the interleaving connections 416 of pancake coil I, on the hand wound or rewound coils, and the connections which face pancake coil I, for example the interleaving connections 416 on pancake coil II, on the machine wound sections.

Thus, there has been shown a new and improved high current winding arrangement which increases the series capacitance of the winding to the maximum possible for a given turn-to-turn voltage stress, provides a uniform distributed series capacitance across the winding, reduces insulation required at the interleaving connections by substantially one-half, and reduces the overall size of the transformer. Further, a winding constructed according to the teachings of this invention will produce a more uniform initial voltage distribution across the winding, which is substantially the same as the final voltage distribution, resulting in the most efficient usage of insulation, the smallest overall winding, and substantially eliminate transient oscillatory voltages upon connecting the transformer to the line and due to high voltage surges.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. A winding for electrical inductive apparatus comprising a plurality of pancake coils assembled in stacked relation, each of said plurality of pancake coils having a plurality of individual coil sections each having entrance and exit ends, said plurality of individual coil sections having conducting turns interleaved with one another in a sequential pattern, means electrically connecting the exit ends of certain of the coil sections to the entrance ends of other of the coil sections to form separate electrical series circuits through each pancake coil, with each series circuit including at least two interleaved coil sections in each pancake coil, each series circuit in each pancake coil having at least one section interleaved with at least one section of all other series circuits in that pancake coil, means electrically connecting the free exit ends of the coil sections of one pancake coil with the free entrance ends of the coil sections of another pancake coil to form separate electrical series circuits throughout said winding, leaving a pancake coil at one end of the winding with coil sections having free entrance ends and a pancake coil at the other end of the winding with coil sections having free exit ends, means electrically connecting the free entrance ends, and means electrically connecting the free exit ends at their respective ends of said winding, to form parallel electrical circuits through said winding.

2. A winding for electrical inductive apparatus comprising a plurality of pancake coils assembled in spaced, stacked, side-by-side relation to form cooling ducts between said pancake coils, each of said plurality of pancake coils having a plurality of individual coil sections each having entrance and exit ends, said plurality of individual coil sections having conducting turns interleaved with one another in a sequential pattern, first means electrically connecting the exit end of certain of the coil sections in each pancake coil to the entrance end of other of the coil sections in the same pancake coil to form separate electrical series circuits through each pancake coil, with each series circuit including at least two interleaved coil sections in each pancake coil, each series circuit in each pancake coil having at least one section interleaved with at least one section of all other series circuits in that pancake coil, said first means being disposed on alternately reversed sides of said pancake coils, occupying certain of the ducts formed between said pancake coils, second means electrically connecting the free exit ends of the coil sections of certain of the pancake coils with the free entrance ends of the coil sections of another pancake coil to form separate electrical paths throughout said winding, leaving a pancake coil at one end of the winding with coil sections having free entrance ends and a pancake coil at the other end of said winding with coil sections having free exit ends, third means electrically connecting the free entrance ends of the pancake coil at the one end of said winding together, and fourth means electrically connecting the free exit ends of the pancake coil at the other end of said winding together, to form parallel electrical paths through said winding.

3. A winding for electrical inductive apparatus comprising a plurality of pancake coils assembled in spaced, stacked, side-by-side relation to form ducts between said pancake coils, each of said plurality of coils having a plurality of individual coil sections each having entrance and exit ends, said plurality of individual coil sections having conducting turns interleaved with one another in a sequential pattern, first means electrically connecting the exit end of certain of the coil sections in each pancake coil to the entrance end of other of the coil sections in the same pancake coil to form separate electrical series circuits through each pancake coil, with each series circuit including at least two interleaved coil sections in each pancake coil, each series circuit in each pancake coil having at least one section interleaved with at least one section of all other series circuits in that pancake coil, said first means being disposed on alternately reversed sides of said pancake coils, occupying alternate ducts throughout said winding, solid insulation disposed in the intervening ducts, second means electrically connecting the free exit ends of the coil sections of certain of the pancake coils with the free entrance ends of the coil sections of another pancake coil to form separate electrical paths throughout said winding, leaving a pancake coil at one end of the winding with coil sections having free entrance ends and a pancake coil at the other end of said winding with coil sections having free exit ends, third means electrically connecting the free entrance ends of the pancake coil at the one end of said winding together, and fourth means electrically connecting the free exit ends of the pancake coil at the other end of said winding together, to form parallel electrical paths through said winding.

4. A winding for electrical inductive apparatus comprising a plurality of pancake coils assembled in stacked relation, each of said plurality of pancake coils having first, second, third and fourth coil sections formed by first, second, third and fourth conductors each having entrance and exit ends and spirally wound together in a continuous interleaved sequence, the exit end of two of said coil sections each being electrically connected to an entrance end of one of the remaining coil sections in each of said pancake coils to form separate electrical series circuits through each pancake coil, with each series circuit including at least two interleaved coil sections in each pancake coil, each series circuit in each pancake coil having at least one section interleaved with at least one section of all other series circuits in that pancake coil, the free exit ends of the coil sections in one pancake coil being connected to the free entrance ends of the coil sections in the adjacent pancake coil, leaving a pancake coil at one end of said winding with coil sections having free entrance ends and a pancake coil at the other end of said winding with coil sections having free exit ends, means electrically connecting the free entrance ends of the pancake coil at the one end of said winding together, and means electrically connecting the free exit ends of the pancake coil at the other end of said winding together, to form parallel electrical paths through said winding.

5. A winding for electrical inductive apparatus comprising a plurality of pancake coils having inside and outside portions assembled in stacked relation, each of said plurality of pancake coils having first, second, third and fourth coil sections formed from first, second, third and fourth conductors each having entrance and exit ends and spirally wound together in a continuous interleaved sequence, said coil sections in alternate pairs of said pancake coils entering the outside portion of said pancake coils and said coil sections in the intervening pancake coils entering the inside portion of said pancake coils the exit ends of two of said coil sections each being connected to an entrance end of one of the remaining two coil sections to form two separate electrical series circuit through each pancake coil, with each series circuit in each pancake coil having two sections interleaved with one another, each series circuit in each pancake coil having its sections interleaved with the sections of the other series circuit in each pancake coil, means connecting the free exit ends of the coil sections of said pancake coil to the free entrance ends of the coil sections of adjacent pancake coils to form separate electrical series circuits through said winding, leaving a pancake coil at one end of said winding with coil sections having free entrance ends and a pancake coil at the other end of said winding with coil sections having free exit ends, means electrically connecting the free entrance ends together and means electrically connecting the free exit ends together at the ends of said winding to form parallel electrical paths through said winding.

6. A winding for electrical inductive apparatus comprising a plurality of pancake coils having inside and outside portions assembled in stacked relation, each of said plurality of pancake coils having first, second, third and fourth coil sections formed from first, second, third and fourth conductors each having entrance and exit ends and spirally wound together in a continuous interleaved sequence, said coil sections entering the inside portion of said pancake coils, the exit ends of two of said coil sections each being connected to an entrance end of one of the remaining two coil sections to form two separate electrical series circuits through each pancake coil, with each series circuit having its sections interleaved with one another in each pancake coil, each series circuit in each pancake coil having its sections interleaved with the sections of the other series circuit in each pancake coil, means connecting the free exit ends of the coil sections of said pancake coils to the free entrance ends of the coil sections of adjacent pancake coils to form separate electrical series circuits through said winding, leaving a pancake coil at one end of said winding with coil sections having free entrance ends and a pancake coil at the other end of said winding with coil sections having free exit ends, means electrically connecting the free entrance ends together, and means electrically connecting the free exit ends together at the respective ends of said winding, to form parallel electrical paths through said winding.

7. A winding for electrical inductive apparatus comprising a plurality of pancake coils having inside and outside portions assembled in stacked relation, each of said plurality of pancake coils being formed by an even numbered plurality of conductors each having entrance and exit ends spirally wound together to form an even numbered plurality of interleaved coil sections, said coil sections in alternate pairs of said pancake coils entering the outside portion of said pancake coils and said coil sections in the intervening pancake coils entering the inside portion of said pancake coils, said coil sections in each pancake coil being connected in series in groups of two by connecting the exit end of a predetermined coil section to the entrance end of a predetermined coil section to form a plurality of separate electrical paths through each pancake coil, with each path including at least two sections interleaved with one another in each pancake coil, each electrical path in each pancake coil having at least one section interleaved with at least one section of all other electrical paths in that pancake coil, means connecting the free exit ends of the coil sections of said pancake coils to predetermined free entrance ends of the coil sections of adjacent pancake coils to form a plurality of separate electrical paths through said winding, leaving a pancake coil at one end of said winding with coil sections having free entrance ends and a pancake coil at the other end of said winding with coil sections having free exit ends, means electrically connecting the free entrance ends together and means electrically connecting the free exit ends together at their respective ends of said winding to form parallel electrical paths through said winding.

8. A winding for electrical inductive apparatus comprising a plurality of pancake coils having inside and outside portions assembled in stacked relation, each of said plurality of pancake coils being formed by an even numbered plurality of conductors each having entrance and exit ends spirally wound together to form an even numbered plurality of interleaved coil sections, said coil sections entering the inside portion of said pancake coils, said coil sections in each pancake coil being connected in series in groups of two by connecting the exit end of a predetermined coil section to the entrance end of a predetermined coil section to form a plurality of separate electrical paths through each pancake coil, with each electrical path including at least two sections interleaved with one another in each pancake coil, each electrical path in each pancake coil having at least one section interleaved with at least one section of all other electrical paths in that pancake coil, means connecting the free exit ends of the coil sections of certain of said pancake coils to predetermined entrance ends of the coil sections of adjacent pancake coils to form a plurality of separate electrical paths through said winding, leaving a pancake coil at one end of said winding with coil sections having free entrance ends and a pancake coil at the other end of said winding with coil sections having free exit ends, means electrically connecting the free entrance ends together and means electrically connecting the free exit ends together at the respective ends of said winding to form parallel electrical paths through said winding.

9. A winding for electrical inductive apparatus comprising a plurality of pancake coils assembled in stacked relation, each of said plurality of pancake coils having an even numbered plurality of individual coil sections each having entrance and exit ends, said plurality of individual coil sections having conducting turns interleaved with one another in a sequential pattern, first means electrically connecting the exit ends of predetermined coil sections to the entrance ends of other predetermined coil sections in each pancake coil to form interleaving connections which produce separate electrical series circuits through each pancake coil, with each series circuit including at least two interleaved sections in each pancake coil, each series circuit in each pancake coil having at least one section interleaved with at least one section of all other series circuits in that pancake coil, said first means being connected between coil sections chosen to locate a predetermined number of said interleaving connections at the outside and inside turns of certain of said pancake coils, second means electrically connecting the free exit ends of the coil sections of one pancake coil with the free entrance ends of the coil sections of another pancake coil to form separate electrical series circuits through said winding, leaving a pancake coil at one end of said winding with coil sections having free entrance ends and a pancake coil at the other end of said winding with coil sections having free exit ends, third means electrically connecting the free entrance ends, and fourth means electrically connecting the free exit ends at the respective ends of said winding to form parallel electrical circuits through said winding.

10. A winding for electrical inductive apparatus comprising a plurality of pancake coils having inside and outside portions and assembled in stacked relation, each of said plurality of pancake coils being formed by a plurality of conductors spirally wound together to form an even numbered pluarlity of interleaved coil section each having entrance and exit ends, said coil sections in alternate pairs of said pancake coils entering the outside portion of said pancake coils and said coil sections in the intervening pancake coils entering the inside portion of said pancake coils, first means electrically connecting the exit ends of predetermined coil sections to the entrance ends of other predetermined coil sections in each pancake coil to form interleaving connections which produce individual electrical serves paths through each pancake coil, with each electrical series path including at least two interleaved sections in each pancake coil, each series path in each pancake coil having at least one section interleaved with at least one section of all other series paths in that pancake coil, said first means being connected between coil sections chosen to locate said interleaving connections at the outside and inside turns in at least the pancake coils in which the coil sections start at their inside portions, second means electrically connecting the free exit ends of the coil sections of the pancake coils with the free entrance ends of the coil sections of adjacent pancake coils to form separate electrical paths through said winding, leaving a pancake coil at one end of said winding with free entrance ends and a pancake coil at the other end of said winding with free exit ends, third means electrically connecting the free entrance ends together, and fourth means electrically connecting the free exit ends together to form parallel electrical paths through said winding.

11. A winding for electrical inductive apparatus comprising a plurality of pancake coils assembled in stacked relation, each of said plurality of pancake coils being formed by first, second, third and fourth conductors spirally wound together in interleaved fashion, with said first and third conductors being cut at substantially their midpoints to produce a total of six individual coil sections each having entrance and exit ends, the exit end of the first half of said first conductor being connected to the entrance end of the second conductor and the exit end of said second conductor being connected to the entrance end of the second half of said first conductor to produce a first electrical series path through each pancake coil, the exit end of the first half of said third conductor being connected to the entrance end of said fourth conductor and the exit end of said fourth conductor being connected to the entrance end of the second half of said third conductor to produce a second electrical series path through each pancake coil, each series path in each pancake coil having at least two sections interleaved with one another, each series path in each pancake coil having at least one section interleaved with at least one section of the other series path in that pancake coil, means electrically connecting the free exit ends of said pancake coils with the free entrance ends of adjacent pancake coils to form two individual electrical paths through said winding, leaving a pancake coil at one end of said winding with free entrance ends and a pancake coil at the other end of said winding with free exit ends, means electrically connecting the free entrance ends together, and means electrically connecting the free exit ends together, to form two parallel electrical paths through said winding.

12. A winding for electrical inductive apparatus comprising a plurality of pancake coils assembled in stacked relation, each of said plurality of pancake coils being formed by an even numbered plurality of conductors spirally wound together in interleaved fashion, with half of said conductors being cut at substantially their midpoint to produce individual coil sections each having entrance and exit ends, the exit ends of the first half of said cut conductors each being connected to the entrance end of one of said uncut conductors and the exit ends of said uncut conductors each being connected to an entrance end of the second half of said cut conductor to produce a plurality of electrical series paths through each pancake coil, each series path in each pancake coil having at least two sections interleaved with one another, each series path in each pancake coil having at least one section interleaved with at least one section of all other series paths in that pancake coil, means electrically connecting the free exit ends of said pancake coils with the free entrance ends of adjacent pancake coils to form a plurality of individual electrical paths through said winding, leaving a pancake coil at one end of said winding with free entrance ends and a pancake coil at the other end of said winding with free exit ends, means electrically connecting the free entrance ends together, and means electrically connecting the free exit ends together, to form a plurality of parallel connected series paths through said winding.

13. A parallel path interleaved winding for electrical inductive apparatus comprising a plurality of pancake coils, each of said pancake coils comprising a plurality of electrically insulated conductors spiraled together to form a plurality of coil sections each having a plurality of turns said coil sections being connected to form at least two series paths in each pancake coil by a connection between opposite ends of each of said coil sections each series path in each pancake coil having at least two coil sections interleaved with one another, each series path in each pancake coil having at least one coil section interleaved with at least one coil section of all the other series paths in that pancake coil, means electrically connecting each series path in each pancake coil with one of the series paths in an adjacent pancake coil to form a plurality of separate electrical series circuits through said winding having first and second ends, means connecting the first ends of said series circuits together, and means connecting the second ends of said series circuits together, to form a plurality of parallel paths through said winding.

14. An electrical inductive apparatus comprising a magnetic core, a winding disposed on said magnetic core said winding comprising a plurality of pancake coils arranged into a stack, each of said coils having a plurality of individual coil sections each having entrance and exit ends, said plurality of individual coil sections having conducting turns interleaved with one another in a sequential pattern, means electrically connecting the exit ends of certain of the coil sections to the entrance ends of other of the coil sections to form separate electrical series circuits through each pancake coil, with each series circuit including at least two coil sections interleaved with one another in each pancake coil, each series circuit in each pancake coil having at least one coil section interleaved with at least one coil section of all other series circuits in that pancake coil, means electrically connecting the free exit ends of the coil sections of one pancake coil with the free entrance ends of the coil sections of another pancake coil to form separate electrical series circuits through said winding, leaving a pancake coil at one end of the winding with coil sections having free entrance ends and a pancake coil at the other end of the winding having free exit ends, means electrically connecting the free entrance ends together and means electrically connecting the free exit ends together, at the respective ends of said winding, to form a winding having a plurality of separate parallel electrical paths and a high uniform series capacitance across said winding.

15. A parallel path interleaved winding for electrical inductive apparatus comprising a plurality of pancake coils each having inner and outer portions, each of said pancake coils comprising a plurality of electrically insulated conductors spiraled together to form a plurality of coils sections each having a plurality of turns, first connecting means, said coil sections being electrically connected by said first connecting means being disposed between predetermined opposite ends of the coil sections in each pancake coil to provide at least two series paths in each pancake coil, with each series path having at least two coil sections interleaved with one another in each pancake coil, each series path in each pancake coil having at least one coil section interleaved with at least one coil section of all other series paths in that pancake coil, second connecting means electrically connecting each series path in each pancake coil with a certain series path in an adjacent pancake coil to form a plurality of separate electrical series circuits through said winding each having first and second ends, the particular coil sections in each pancake coil which are interconnected to form the series paths being selected to make the connection between said first connecting means and the opposite ends of the two coil sections which form each series path appear at the outer and inner portions of said pancake coils, with the ends of the groups in each pancake coil being aligned with the ends of the groups in adjacent pancake coils to which they are to be connected by said second connecting means and the connections between aid first means and the opposite ends of the strands in each group having an adjacent turn on only one side hereof, third means connecting the first ends of said series circuits together, and fourth means connecting the second ends of said series circuits together to form a plurality of parallel paths through said winding.

16. A winding for electrical inductive apparatus comprising at least first and second pancake coils having inner and outer portions, each of said pancake coils being formed of four conductors each having entrance and exit ends spirally wound together creating first, second, third and fourth coil sections each having an even number of turns, said coil sections entering the outer portion of said first pancake coil and numbered consecutively, said coil sections entering the inner portion of said second pancake coil and numbered consecutively, first means connecting the exit end of the first coil section to the entrance end of the second coil section and the exit end of the third coil section to the entrance end of the fourth coil section in said first pancake coil to form two separate series circuits therein, second means connecting the exit end of the second coil section to the entrance end of the first coil section and the exit end of the fourth coil section to the entrance end of the third coil section in said second pancake coil to form two separate series circuits therein, each series circuit in each pancake coil having two coil sections interleaved with one another, each series circuit in each pancake coil having its coil sections interleaved with the coil sections of the other series circuit in that pancake coil, third means connecting the exit end of the second coil section of said first pancake coil to the entrance end of the second coil section of said second pancake coil, and the exit end of the fourth coil section of said first pancake coil to the entrance end of the fourth coil section of said second pancake coil to form two separate series circuits through said first and second pancake coils, with the connections created by said first and second means in said first and second pancake coils being adjacent to only one turn and the connections created by said third means between said first and second pancake coils and between all subsequent pancake coils being in alignment.

17. A winding for electrical inductive apparatus comprising at least first and second pancake coils having inner and outer portions, each of said pancake coils being formed of four conductors each having entrance and exit ends spirally wound together creating first, second third and fourth coil sections each having an odd number of turns, said coil sections entering the outer portion of said first pancake coil and numbered consecutively, said coil sections entering the inner portion of said second pancake coil and numbered consecutively, first means connecting the exit end of the first coil section to the entrance end of the fourth coil section, and the exit end of the third coil section to the entrance end of the second coil section in said first pancake coil to form two separate series circuits therein, second means connecting the exit end of the second coil section to the entrance end of the third coil section, and the exit end of the fourth coil section to the entrance end of the first coil section in said second pancake coil to form two separate series circuits therein, each series circuit in each pancake coil having two coil sections interleaved with one another, each series circuit in each pancake coil having its coil sections interleaved with the coil sections of the other series circuit in that pancake coil, third means connecting the exit end of the fourth coil section of said first pancake coil to the entrance end of the second coil section of said second pancake coil, and the exit end of the second coil section of said first pancake coil to the entrance end of the fourth coil section of said second pancake coil to form two separate series circuits through said first and second pancake coils, with the connections created by said first and second means in said first and second pancake coils being adjacent to only one turn and the connections created by said third means between said first and second pancake coils and between all subsequent pancake coils being in alignment.

18. A winding for electrical inductive apparatus comprising at least first and second pancake coils having inner and outer portions, each of said pancake coils being formed of four conductors each having entrance and exit ends spirally wound together creating first, second, third and fourth coil sections each having a predetermined number of turns, said coil sections entering the outer portion of said first pancake coil and numbered consecutively, said coil section entering the inner portion of said second pancake coil and numbered consecutively, first means connecting the exit end of the first coil section to the entrance end of the second coil section, and the exit end of the third coil section to the entrance end of the fourth coil section in said first pancake coil to form two separate series circuits therein, second means connecting the exit end of the third coil section to the entrance end of the fourth coil section, and the exit end of the first coil section to the entrance end of the second coil section in said second pancake coil to form two separate series circuits therein, each series circuit in each pancake coil having two coil sections interleaved with one another, each series circuit in each pancake coil having its coil sections interleaved with the coil sections of the other series circuit in that pancake coil, third means connecting the exit end of the second coil section of said first pancake coil to the entrance end of the third coil section of said second pancake coil, and the exit end of the fourth coil section of said first pancake coil to the entrance end of the first coil section of said second pancake coil to form two separate series circuits through said winding, with the total number of turns in each series circuit in said first and second pancake coils being an odd number, the connections created by said first and second means in said first and second pancake coils being adjacent to only one turn and the connections created by said third means between said first and second pancake coils and between all subsequent pancake coils being in alignment, and fourth means connecting the two separate series circuits through said winding together at both the start and finish of said winding.

References Cited by the Examiner
UNITED STATES PATENTS 3,090,022    5/1963    Stein _____ 336—70

References Cited by the Applicant

Publication (Italian) "L'avvolgimento con bobine a spire intercalate nei trasformatori ad alta tensione" by M. Ferrari Bardile Marelli, volume XXXII, No. 1–4, April 1958, pages 3–6.

LEWIS H. MYERS, *Primary Examiner.*